(12) United States Patent  (10) Patent No.: US 7,876,222 B2
Calvarese  (45) Date of Patent: Jan. 25, 2011

(54) CUSTOMIZABLE MECHANICALLY PROGRAMMABLE RFID TAGS

(75) Inventor: Russell Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 484 days.

(21) Appl. No.: 11/847,974

(22) Filed: Aug. 30, 2007

(65) Prior Publication Data

US 2009/0058599 A1   Mar. 5, 2009

(51) Int. Cl.
*G08B 13/14* (2006.01)

(52) U.S. Cl. .................. 340/572.1; 340/10.1; 340/10.5

(58) Field of Classification Search .............. 340/572, 340/10

See application file for complete search history.

(56) References Cited

U.S. PATENT DOCUMENTS

| | | | |
|---|---|---|---|
| 6,734,797 B2 | 5/2004 | Shanks et al. | |
| 6,805,291 B2 * | 10/2004 | Chhatpar et al. | 235/383 |
| 6,840,444 B2 * | 1/2005 | Pierce et al. | 235/383 |
| 6,869,020 B2 * | 3/2005 | Foth et al. | 235/492 |
| 6,869,021 B2 * | 3/2005 | Foth et al. | 235/492 |
| 7,151,455 B2 | 12/2006 | Lindsay et al. | |
| 7,168,626 B2 * | 1/2007 | Lerch et al. | 235/492 |
| 7,170,415 B2 | 1/2007 | Forster | |
| 7,212,127 B2 | 5/2007 | Jacober et al. | |
| 7,304,578 B1 * | 12/2007 | Sayers et al. | 340/572.3 |
| 2004/0074963 A1 * | 4/2004 | Pierce et al. | 235/383 |
| 2004/0075348 A1 * | 4/2004 | Obrea et al. | 307/125 |
| 2005/0092839 A1 * | 5/2005 | Oram | 235/462.13 |
| 2005/0104790 A1 * | 5/2005 | Duron | 343/745 |
| 2006/0152364 A1 * | 7/2006 | Walton | 340/568.1 |
| 2007/0069029 A1 * | 3/2007 | Bauchot et al. | 235/462.45 |
| 2007/0096876 A1 | 5/2007 | Bridgelall et al. | |

OTHER PUBLICATIONS

Swedberg, Claire, "Mikoh Develops Reusable Container with RFID Security Seal", The World's RFID Authority: RFID Journal, Feb. 15, 2007, 2 pages.

* cited by examiner

*Primary Examiner*—Travis R Hunnings

(57) ABSTRACT

A system and method to track a status an item, or steps in a process, via one or more mechanical modifications to an RFID tag. In one embodiment, a plurality of tearable strips are attached to the tag, each strip having an electrical conductor. Each tearable strip may receive a visual or tactile indicia, such as text, a color code, a graphic symbol, or a tactile indicator (such as Braille) to assign a meaning to the strip, where the meaning is associated with the status or condition of the item, or the stage, step, or status or the process. By tearing some strips or all strips, a desired bit pattern may be programmed into a register of the RFID tag. The bit pattern may reflect the status or condition of the item, or the stage, step, or status of a process.

42 Claims, 17 Drawing Sheets

CUSTOMIZABLE MECHANICALLY PROGRAMMABLE RFID TAGS

BACKGROUND

The invention relates in general to the arrangement and use of radio frequency identification (RFID) tags. In particular, the inventions relate to programming a value on an RFID tag using mechanically alterable elements of the tag.

Radio frequency identification (RFID) tags are electronic devices that may be affixed to items whose presence is to be detected and/or monitored. RFID tags are classified based on standards defined by national and international standards bodies (e.g., EPCGlobal and ISO). Standard tag classes include Class 0, Class 1, and Class 1 Generation 2 (referred to herein as "Gen 2"). The presence of an RFID tag, and therefore the presence of the item to which the tag is affixed, may be checked and monitored wirelessly by an "RFID reader", also known as a "reader-interrogator", "interrogator", or simply "reader." Readers typically have one or more antennas for transmitting radio frequency signals to RFID tags and receiving responses from them. An RFID tag within range of a reader-transmitted signal responds with a signal including a unique identifier.

With the maturation of RFID technology, efficient communication between tags and readers has become a key enabler in supply chain management, especially in manufacturing, shipping, and retail industries, as well as in building security installations, healthcare facilities, libraries, airports, warehouses etc. Many processes, as well as the status of many items, may be readily monitored via RFID tags RFID tags have been developed where, by means of mechanical alterations to a tag (such as, for example, by severing or completing an external circuit path associated with the tag), it is possible to modify an internal data state of the tag. In this way, an RFID tag may be used to report on a mechanically changed state or other condition of items with which a tag is associated. For example, an RFID tag attached to a container of medicine may be used to monitor, and to report on, whether the container has been tampered with, or whether the cap has been removed. Similarly, RFID tags may be used to report on markings made on a written sheet, provided the conductivity of the sheet is altered in the process of marking the sheet, and provided a circuit path associated with the RFID tag is thereby modified as well.

In general then, there have been uses of RFID tags where mechanical, "off-chip", modifications to a circuit path have been employed to modify a data state of a tag, and so modify the data reported by the tag. Generally, however, custom RFID tags and custom off-chip or custom off-tag mechanisms have been employed for these purposes. There has been no general-purpose, off-the-shelf, mechanically-programmable RFID tag, usable in a wide variety of contexts and applications as new needs arise, which can be easily used to generically monitor items or processes as changes occur.

What is needed, then, is an RFID tag which can be easily mechanically modified to indicate and report changes in data states, and which can further be easily applied to and integrated into diverse contexts for item/process monitoring and reporting purposes.

SUMMARY

This section is for the purpose of summarizing some aspects of the inventions described more fully in other sections of this patent document. It briefly introduces some preferred embodiments. Simplifications or omissions may be made to avoid obscuring the purpose of the section. Such simplifications or omissions are not intended to limit the scope of the claimed inventions.

The invention described in this patent document relate in general to mechanically modifiable RFID tags, where such mechanical modifications are used to change an internally stored or internally represented data state of the tag. In an embodiment, an RFID tag may have attached to it a plurality of strips, which may be strips of paper, and which can be torn. A bit pattern stored in a register of the RFID tag is modified by tearing the strips. Each strip can be readily impressed with some identifier, which may be print or tactile, and which indicates to a human user a meaning of the strip.

The invention can be implemented in numerous ways, including methods, systems, devices, and computer readable medium. Several embodiments of the invention are described below, but they are not the only ways to practice the invention described herein.

BRIEF DESCRIPTION OF THE DRAWINGS/FIGURES

The accompanying drawings, which are incorporated herein and form a part of the specification, illustrate the invention and, together with the description, further serve to explain the principles of the invention and to enable a person skilled in the pertinent art to make and use the invention.

In the drawings, like reference numbers indicate identical or functionally similar elements.

Additionally, references numbers which are the same, but vary by virtue of an appended letter of the alphabet (for example, 412, 412R, 412P, 412S) or an appended letter and number (for example, 412, 412S1, 412S2) indicate elements which may be substantially the same or similar, but represent variations or modifications of the basic element. In some cases, the reference number without the appended letter or without the appended letter and number (for example, 412) may indicate a generic form of the element, while reference numbers with an appended letter or an appended letter and number (for example, 412S, 412S1, 412S2, 412P) may indicate a more particular or modified form of the element.

Additionally, the leftmost digit(s) of a reference number identifies the drawing in which the reference number first appears. For example, an element labeled 412 typically indicates that the element first appeared in FIG. 4.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

1. Exemplary Operating Environment

2. Overview of Customizable Mechanically Programmable RFID Tags

3. Exemplary Customizable Mechanically Programmable RFID Tags

4. Mechanical Modification of Exemplary RFID Tags

5. Determination of Strip States of Exemplary RFID Tags

6. Changing Values Associated With Strips of Exemplary RFID Tags

7. Further Exemplary RFID Tags and Features Thereof

8. Applications of Exemplary Customizable, Mechanically Programmable RFID Tags

9. Methods Associated With Customizable, Mechanically Programmable RFID Tags

10. Alternative Embodiments

11. Conclusion

1. EXEMPLARY OPERATING ENVIRONMENT

Figure 1:
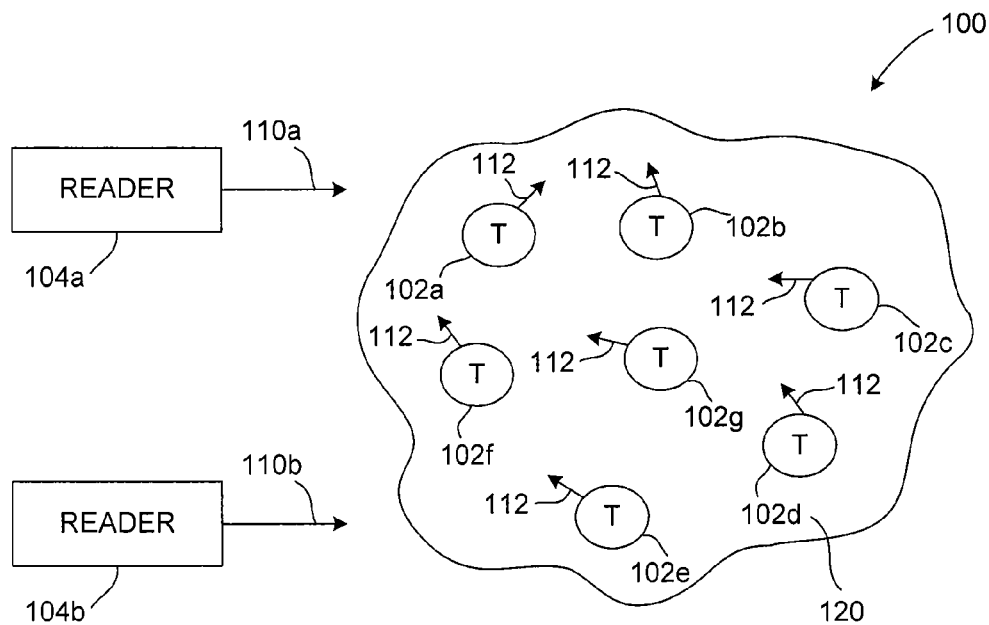
FIG. 1 shows an environment where RFID readers communicate with an exemplary population of RFID tags.

Before describing embodiments of the invention in detail, it is helpful to describe an example RFID communications environment in which the inventions may be implemented. FIG. 1 illustrates an environment 100 where RFID tag readers 104 (readers 104a and 104b shown in FIG. 1) communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network (see FIG. 2).

As shown in FIG. 1, reader 104a "reads" tags 120 by transmitting an interrogation signal 110a to the population of tags 120. Interrogation signals may have signal carrier frequencies or may comprise a plurality of signals transmitted in a frequency hopping arrangement. Readers 104a and 104b typically operate in one or more of the frequency bands allotted for this type of RF communication. For example, the Federal Communication Commission (FCC) defined frequency bands of 902-928 MHz and 2400-2483.5 MHz for certain RFID applications.

Tag population 120 may include tags 102 of various types, such as, for example, various classes of tags as enumerated above. Thus, in response to interrogation signals, the various tags 102 may transmit one or more response signals 112 to an interrogating reader 104. Some of the tags, for example, may respond by alternatively reflecting and absorbing portions of signal 104 according to a time-based pattern or frequency. This technique for alternatively absorbing and reflecting signal 104 is referred to herein as backscatter modulation. Typically, such backscatter modulation may include one or more alpha-numeric characters that uniquely identify a particular tag. Readers 104a and 104b receive and obtain data from response signals 112, such as an identification number of the responding tag 102. In the embodiments described herein, a reader may be capable of communicating with tags 102 according to various suitable communication protocols, including Class 0, Class 1, EPC Gen 2, other binary traversal protocols and slotted aloha protocols, and any other protocols mentioned elsewhere herein, and future communication protocols. Additionally, tag population 120 may include one or more tags having the packed object format described herein and/or one or more tags not using the packed object format (e.g., standard ISO tags).

Figure 2:
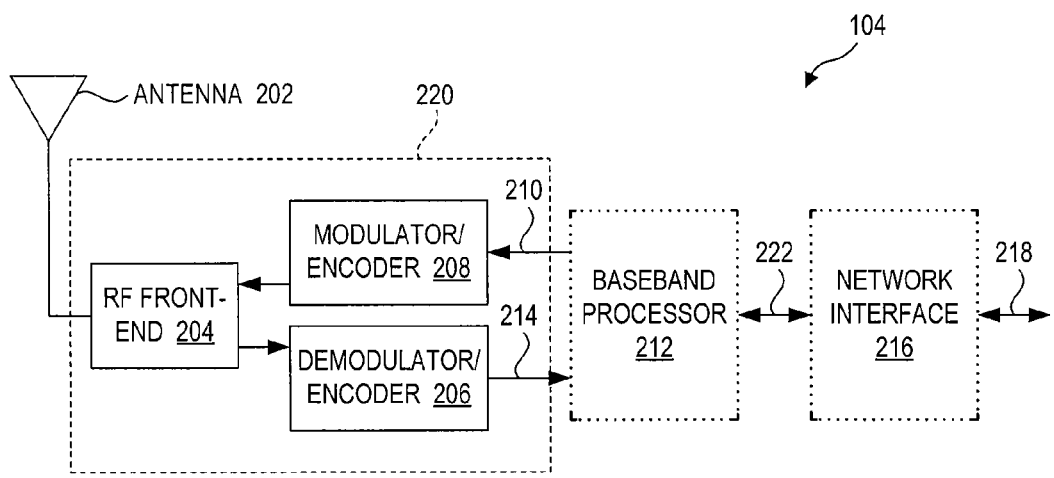
FIG. 2 shows a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including for example and without limitation, a vertical, dipole, loop, Yagi-Uda, slot, and patch antenna type.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as, for example, one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
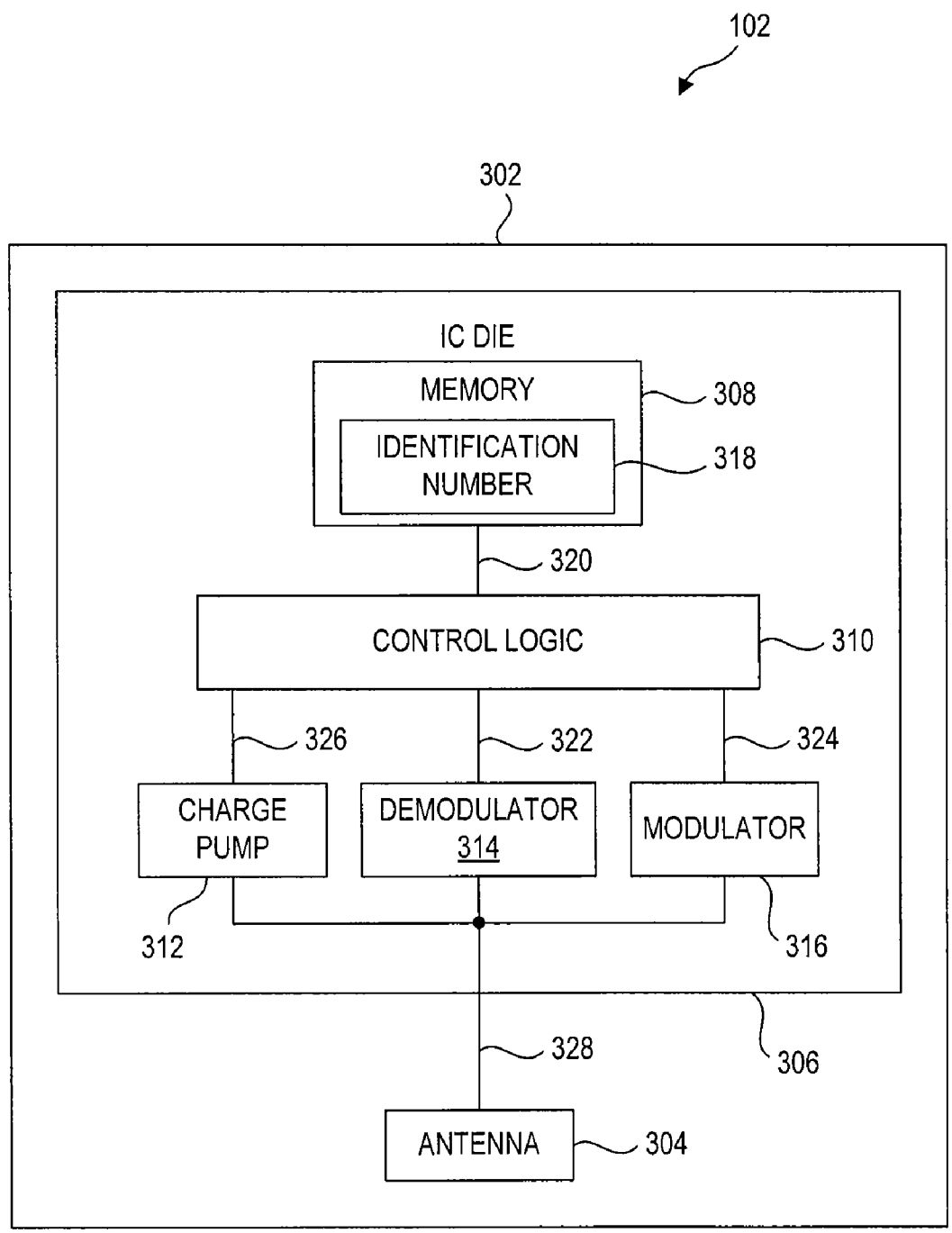
FIG. 3 shows a block diagram of an exemplary radio frequency identification (RFID) tag.

The invention described herein is applicable to any type of RFID tag, with suitable additional features, as described in further detail below in conjunction with FIG. 4 and beyond. FIG. 3 is a schematic block diagram of an example radio frequency identification (RFID) tag 102 as already known to those practiced in the art. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including for example dipole, loop, slot, and patch. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. Inputs of charge pump 312, and demodulator 314, and an output of modulator 316 are coupled to antenna 304 by antenna signal 328.

Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on an input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112 (see FIG. 1), which is received by reader 104. In one example embodiment, modulator 316 includes a switch, such as a single pole, single throw (SPST) switch. The switch is configured in such a manner as to change the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 powers circuits of IC die 306, including control logic 320.

Charge pump 312 rectifies a portion of the power of the radio frequency communication signal of antenna signal 328 to create a voltage power. Charge pump 312 increases the voltage level of the rectified power to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by a battery, not shown).

Memory 308 is typically a non-volatile memory, but can alternatively be a volatile memory, such as a DRAM. Memory 308 stores data, including an identification number 318. In a Gen-2 tag, tag memory 308 may be logically separated into four memory banks.

2. OVERVIEW OF CUSTOMIZABLE MECHANICALLY PROGRAMMABLE RFID TAGS

The following sections of this specification, along with FIGS. 4 through 18, describe exemplary embodiments that incorporate the features of the inventions. The embodiment(s) described, and references in the specification to "exemplary embodiment", "one embodiment", "an embodiment", "an example embodiment", etc., indicate that the embodiment(s) described may include a particular procedure, operation, step, feature, structure, or characteristic, but every embodiment may not necessarily include the particular procedure, operation, step, feature, structure, or characteristic. Moreover, such phrases are not necessarily referring to the same embodiment. Further, when a particular procedure, operation, step, feature, structure, or characteristic is described in connection with an embodiment, it is understood that it is within the knowledge of one skilled in the art to effect such procedure, operation, step, feature, structure, or characteristic in connection with other embodiments whether or not explicitly described.

While specific methods and configurations are described, it should be understood that this is done for illustration purposes only. A person skilled in the art will recognize that other configurations and procedures may be used without departing from the spirit and scope of the invention.

In particular, RFID tag embodiments are described wherein mechanical modifications to mechanically modifiable elements of the tag result in a change of a value reported by the tag. Moreover, embodiments are described wherein a variety of customizations may be made to the RFID tag. These customizations may include, but are not limited to, using an RF signal to program the RFID tag, and thereby customize the effect of the mechanical modifications on the values reported by the tag; and, applying markings or other indicia to the tag to indicate a meaning of the mechanically modifiable elements of the tag.

Persons skilled in the relevant arts will recognize that the elements, methods, techniques, and principles of the inventions may be applied, with suitable modifications, to other kinds of radio frequency reporting systems which may employ mechanically modifiable elements.

3. EXEMPLARY CUSTOMIZABLE MECHANICALLY PROGRAMMABLE RFID TAGS

Figure 4:
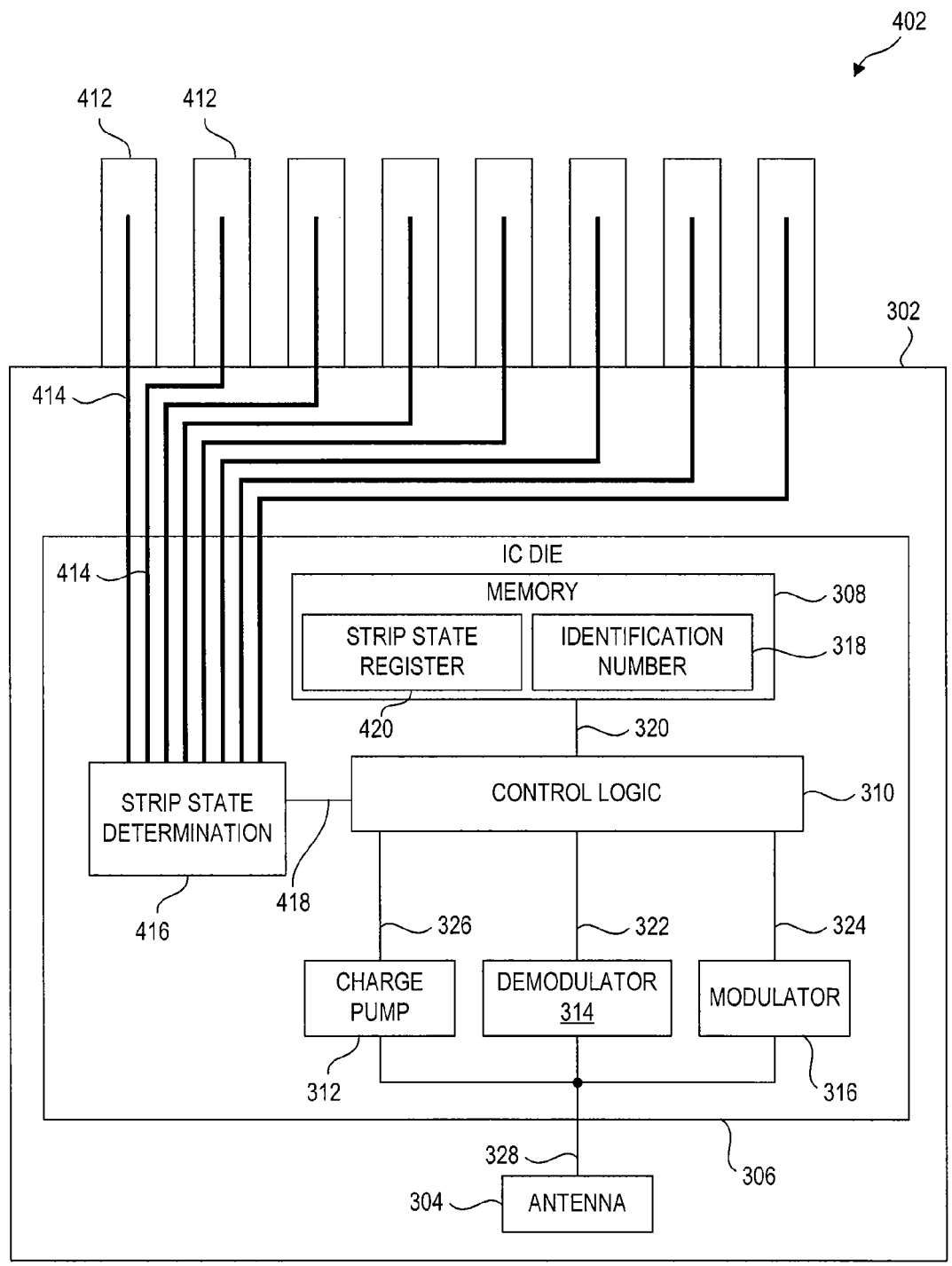
FIG. 4 shows a block diagram of an exemplary mechanically programmable RFID tag according to the present system and method.

FIG. 4 illustrates an exemplary RFID tag 402 according to an embodiment of the invention. Exemplary RFID tag 402 contains numerous elements in common with RFID tag 102 already described above in conjunction with FIG. 3, and therefore a discussion of these elements will not be repeated.

RFID tag 402 has a plurality of mechanically alterable elements 412, which may be tearable strips of material or punchable strips of material. Mechanically alterable elements 412 may be manufactured from materials which may be readily mechanically manipulated, torn, and punched, including for example and without limitation such materials as paper, cardboard, various plastics, other polymers, and other tearable or punchable materials.

Mechanically alterable elements 412 may be referred to synonymously herein as mechanically modifiable elements 412, tearable elements 412, rip strips 412, punchable elements 412, punchable strips 412, or strips 412. Mechanically alterable elements 412 may be attached to an edge of substrate 302 of RFID tag 402 or to a surface of substrate 302 of RFID tag 402. Mechanically modifiable elements 412 may be rectangular in shape, as illustrated in FIG. 4 and other figures herein, but may have other shapes as well, including for example and without limitation triangular, circular, semicircular, oval, ellipsoid, and other shapes as well. Different shapes and sizes of mechanically alterable elements 412, as well as different materials, may be combined on a single RFID tag 402. In one exemplary embodiment, mechanically modifiable elements 412 may be strips of paper or other flexible material which may be equally sized, have a rectangular shape, and extend from the body or substrate 302 of RFID tag 402.

Exemplary RFID tag 402 also includes conductors 414 and a strip state determination module 416. For each mechanically modifiable element 412 there is an associated conductor 414. Conductor 414 is an electrically conducting material made of materials well known in the art for use in electronics which may include, for example and without limitation, copper, aluminum, silver, gold, tin, and a variety of metal alloys. Each conductor 414 is coupled to strip state determination module 416, and runs along or within substrate 302, extending into a mechanically modifiable element 412.

Since mechanically modifiable elements 412 may be strips of paper or other flexible, pliable material, mechanically modifiable elements 412 will henceforth be simply referred to as strips 412. It should be noted that because, in an embodiment, strips 412 may be deliberately torn or ripped, they are sometimes referred to for convenience as "rip strips".

Strip state determination module 416 is part of IC 306. Strip state determination module 416 may be coupled to control logic 310, for example via a strip state determination bus 418. Also, found on IC 306 is a strip state register which may be used to store or report on a condition of strips 412.

In one embodiment, strip state register 420 may be part of memory 308. However, strip state register 420 may be separate from tag identification number 318, which may also be part of memory 308. In an alternative embodiment strip state register 420 may instead be a part of strip state determination module 416.

Strip state determination module 416 is configured to determine the state of strips 412. Each strip 412 may be in a state in which it maintains the electrical conductivity of its associated conductor 414. However, mechanically altering strip 412 may disrupt the flow of electricity through its associated conductor 414.

There are a number of ways in which a strip 412 may be mechanically modified in order to disrupt the flow of electricity in its associated conductor 414. For example, among other possible means, strip 412 may be physically torn or ripped, or strip 412 may be punched using a conventional mechanical hole puncher or similar device. Strip state determination module 416 is configured to electrically sense the conductive state, which may be either conductive or nonconductive, of each conductor 414 associated with each strip 412.

Conductor 414 may be embedded within strip 412, or may run along a surface of strip 412, or may be partly embedded within strip 412 and run partly along a surface or surfaces of strip 412.

While strip state determination module 416 is shown as separate from control logic 310 and coupled to control logic 310 (for example, by bus 418), this is principally for purposes of clarity of presentation. In embodiments, there needs to be some circuitry within RFID tag 402 which is configured to determine the state of strips 412. In some embodiments, strip state determination module 416 may actually be a part of control logic 310, rather than being apart from control logic 310 as illustrated. The details of the configuration are not essential, provided that IC 316 contains necessary circuitry to determine the state of strips 412. For the remainder of description such circuitry will be referred to as strip state determination module 416.

Figure 5:
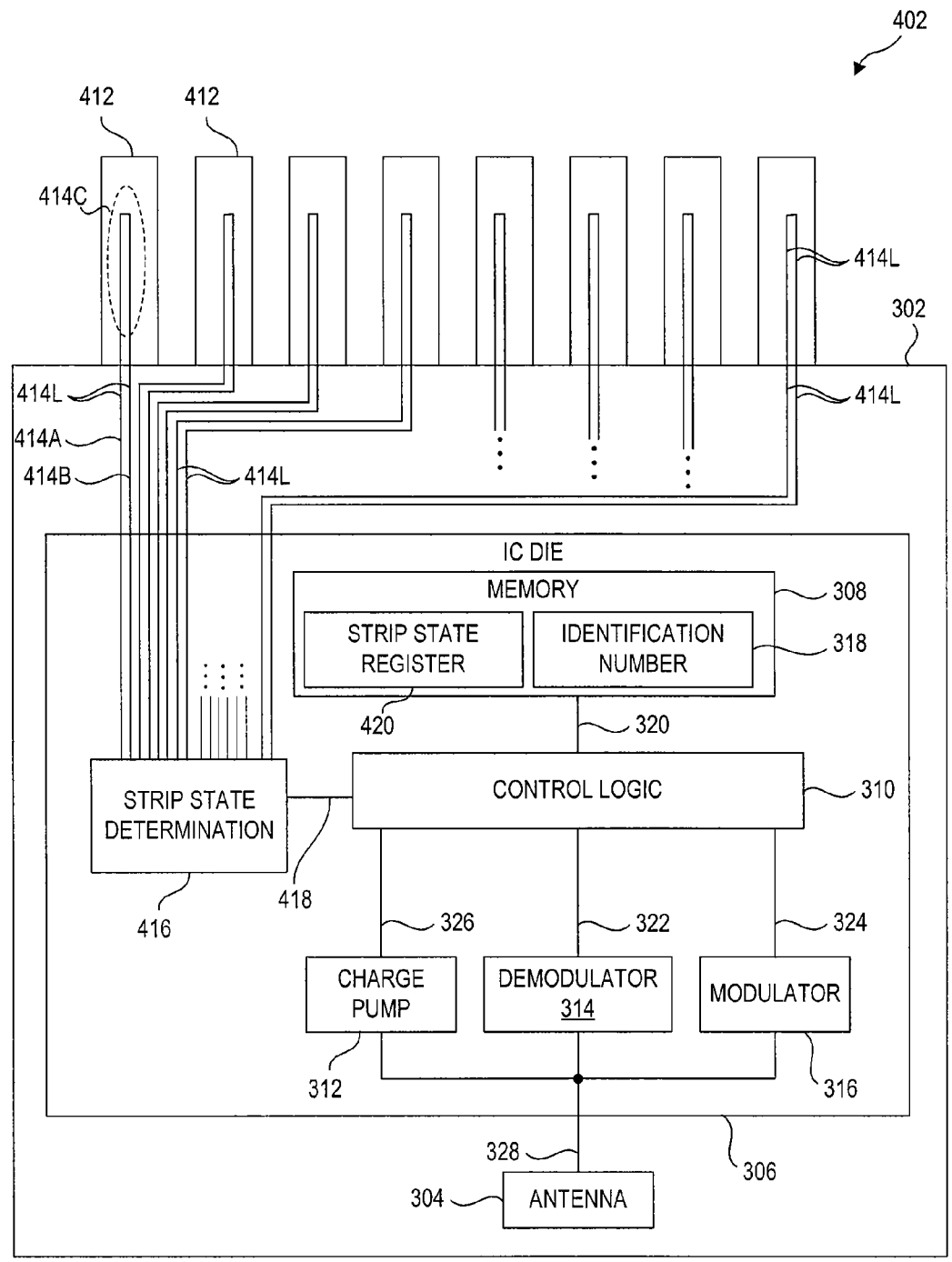
FIG. 5 shows another view of a block diagram of an exemplary mechanically programmable RFID tag according to the present system and method.

FIG. 5 presents another exemplary embodiment of a customizable, mechanically programmable RFID tag 402. Some of the elements illustrated in FIG. 5 are similar to those described above and shown in FIG. 3 and FIG. 4, and the description of those elements will not be repeated.

In FIG. 5, each conductor 414 associated with a strip 412 is a conductive loop 414L having two leads 414A and 414B, and a terminal part of the loop 414C. Both lead 414A and lead 414B are coupled to strip state determination module 416, and extend across or through substrate 302, and physically into and through strip 412. Lead 414A and lead 414B of exemplary conductive loop 414L are electrically connected within the body of tag 412 at terminal end 414C.

Because conductive loop 414L (comprising elements 414A, 414B, 414C) is coupled to strip state determination module 416, strip state determination module 416 may then be configured to determine if conductive loop 414L remains intact, and therefore comprises a closed circuit path which will conduct a flow of electricity; or whether conductive loop 414L has been mechanically disrupted, and therefore no longer comprises a closed circuit path and may no longer be configured to conduct a flow of electricity.

Not all of the strips 412, and their associated conductive loops 414L, are actually illustrated in FIG. 5 as being electrically coupled to strip state determination module 416. For ease of illustration, only partial connections are shown, along with ellipses indicating that the connections continue. This practice is repeated in some other figures as well. In fact, each strip 412 may have an associated conductor 414 which is electrically coupled with strip state determination module 416, for example, by extending on the surface of or through the body of strip 412, along or within substrate 303, and terminating at strip state determination module 416. However, some strips may intentionally not have an associated conductor 414 and may be present only for other indicating purposes.

4. MECHANICAL MODIFICATION OF EXEMPLARY RFID TAGS

Figure 6:
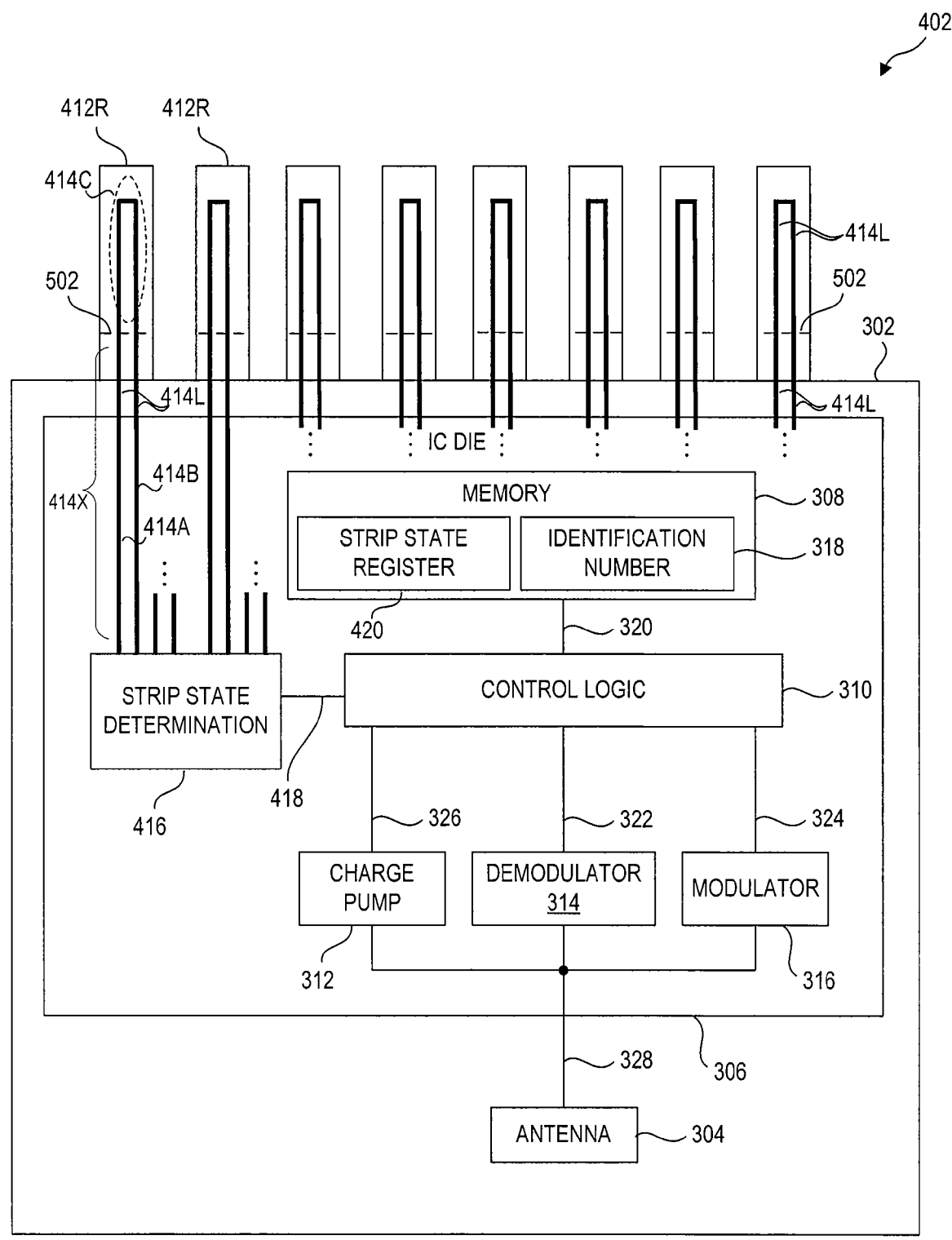
FIG. 6 shows another view of a block diagram of an exemplary mechanically programmable RFID tag according to the present system and method.

FIG. 6 shows another exemplary RFID tag 402 embodiment. Some of the elements shown in FIG. 6 have already been described in conjunction with other figures above, and description of those elements will not be repeated.

As illustrated in FIG. 6, exemplary RFID tag 402 may include strips 412 which are rippable. Rippable may be viewed as synonymous with tearable. The rippable strips have been labeled 412R, where R is for "rippable". Each strip 412R may have an optional perforation 502. Perforation 502 may be an actual perforation, meaning holes or similar elements, such as slits or seams, which have been cut through strips 412, or perforations 502 may simply be dotted lines or other demarcation printed on strips 412 as an indication of a place where strips 412 may be torn or cut by a user.

Each strip 412R has an associated conductive loop 414L as previously described, where conductive loop 414L has leads 414A and 414B coupled to strip state determination module 416, and extending up to and into rip strip 412R. Further, and as previously described, terminal element 414C of conductive loop 414L completes the connection between leads 414A and 414B. In particular, FIG. 6 highlights that terminal element 414C, and a segment 414X of conductive loop 414L closer to substrate 312 than terminal element 414C, are on opposite sides of a boundary defined by perforation 520 on rip strip 412R, with terminal element 414C on the far side of perforation 520 from substrate 312.

Consequently, if rip strip 412R were to be torn, ripped, severed, or separated at the location of or substantially at the location of perforation 502, then terminal component 414C would be removed. This in turn would leave leads 414A and 414B with no electrical connection. As a consequence, an electric current could no longer be conducted in a closed circuit from lead 414A to 414B. This lack of conductivity, reflecting an open circuit path, would be an electrical state which is detectable by strip state determination module 416.

Mechanical modification of exemplary RFID tag 402 has been illustrated and described here with respect to a method of tearing or ripping an exemplary rip strip 412R. However, it will be apparent to persons skilled in the relevant arts, and will be described further below, that other means may also be employed to mechanically modify strips 412 in such a way as to alter the electrical states of associated conductors 414.

5. DETERMINATION OF STRIP STATES OF EXEMPLARY RFID TAGS

Figure 7:
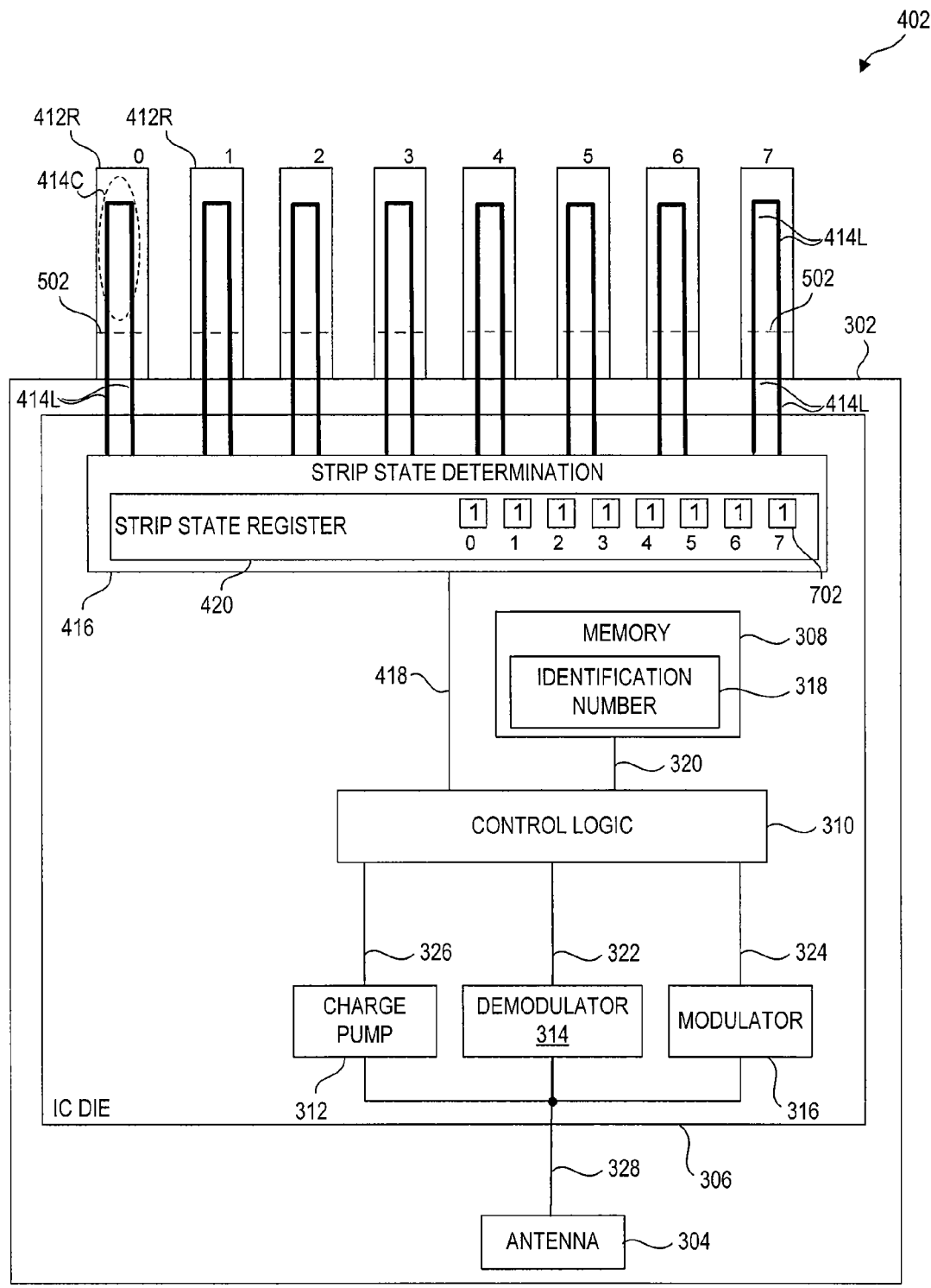
FIG. 7 shows another view of a block diagram of an exemplary mechanically programmable RFID tag according to the present system and method.

FIG. 7 illustrates further aspects of exemplary RFID tag 402. FIG. 7 illustrates some elements of exemplary RFID tag 402 which were described previously above, and description of those elements will not be repeated.

In FIG. 7 certain elements already described have been redrawn or rearranged for clarity and without any substantial change in functionality. For example, all eight of strips 412R are now illustrated with their associated conductors 414 directly coupled to strip state determination module 416. In addition, strip state register 420 has now been moved from memory 308 to be within strip state determination module 416. Persons skilled in the relevant arts will be recognize that the particular placement of strip state register 420 is not essential to the actual functionality of the invention disclosed herein.

Strip state register 420 is now illustrated as having a plurality of bits 702. Each bit 702 may store a value which, in an embodiment, may be a 1-bit value of zero or one. Further, each bit 702 has an identifying address, numbered 0, 1, 2, 3, 4, 5, 6, and 7, which associates each such bit with a corresponding strip 412R, where strips 412R have also been labeled 0, 1, 2, 3, 4, 5, 6, and 7.

In an embodiment, each bit 702 of strip state register 420 has a default value. A bit 702 may have a default value of "1", which is associated with an intact strip 412. Further, upon mechanical alteration of strip 412 such that strip 412 is no longer intact, conductive loop 414L associated with the strip is no longer configured to conduct electricity. This change of state may be detected by strip state determination module 416. Consequently, the associated bit 702 of strip state register 420 may change its state from a "1" to a "0", the "0" value indicating that the strip 412 is no longer intact. In an alternative embodiment, the default value of a bit 702 representing an intact strip 412 may be a value of "0", and therefore the value which indicates a mechanically changed strip 412 may be a value of "1".

Effectively, then, each bit 702 of strip state register 420 may be effectively coupled to a respective strip 412 in such a manner (logically, direct connection, etc.) that a mechanical alteration (for example, ripping, tearing. punching, or other mechanical alterations as appropriate) of the respective strip 412 results in a change in the bit value of the coupled bit 702. Persons skilled in the relevant arts will recognize that such coupling between a strip 412 and a bit 702 may be via a direct or indirect electrical connection, or via a logical coupling mediated through such components as strip state determination module 416, control logic 310, or similar control components of IC 306, or through a combination of the above.

Figure 8:
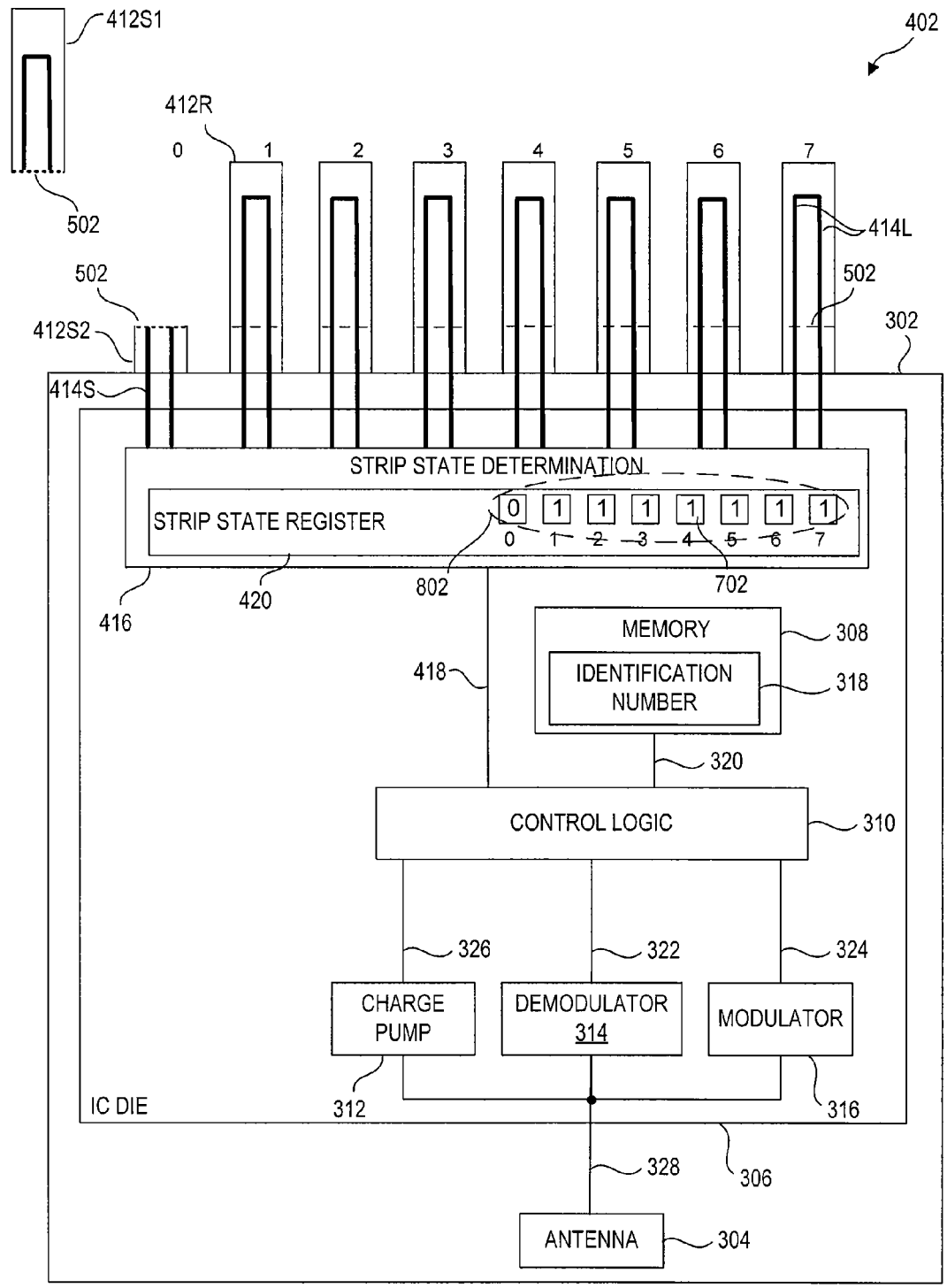
FIG. 8 shows another view of a block diagram of an exemplary mechanically programmable RFID tag according to the present system and method.

FIG. 8 shows another exemplary RFID tag 402 embodiment. Some elements illustrated in FIG. 8 have already been described above, and a discussion of these elements will not be repeated.

A first strip 412S has been torn, ripped, cut, or otherwise severed at perforation 502. Strip 412S therefore now has two parts, 412S1 and 412S2. (In "412S", the letter 'S' stands for "severed".) 412S1 is the part which has been severed from the strip. It is illustrated in the figure for purposes of exposition, but from a functional or operational stand point in relation to RFID tag 402, severed strip part 412S1 may serve no further use, and in operational practice may be disposed of by a user. (For some organizational purposes, such as auditing a process associated with RFID tag 402 or otherwise auditing use of RFID tag 402, severed strip part 412S may be retained or stored; alternatively, some identifier or indicia (discussed further below) from severed strip part 412S may be recorded by a user in a journal or database before severed strip part 412S is disposed of by a user.)

412S2 is a stump of strip 412S which remains attached to substrate 302. Running through strip stump 412S2 is conductor 414S which is now composed of two separate parts that are no longer electrically connected. Strip state determination module 416 is configured to detect that a current no longer can flow through conductor 414. On this basis, logic within strip state determination module 416 determines that strip 412S has been modified (that is, severed). In turn, strip state determination module 416 changes the state of a bit 702 associated with the torn strip 412S. As shown, for the bit 702 whose address is bit 0, and which is associated with the modified strip 412S at position zero, the bit 0 now has a value of "0" rather than "1". The value of "0" reflects the fact that strip 412S is physically severed.

In this way, a mechanical action on the part of the user, namely the severing of strip 412S, is now reflected in an appropriate or matching bit 702 whose address is bit 0 of strip state register 420. It may further be seen that the eight bits 702 of strip state register 420 now have a bit pattern 802 which corresponds to the state of all the strips 412R. For example, it can be seen that the 0 strip is severed or modified, whereas strips 1 through 7 remain intact. The corresponding bit pattern 802 shows the 0-address bit as having the value of "0" whereas bits at bit addresses 1-7 each have a value of "1", reflecting the fact that the associated strips 412 remain intact.

Figure 9:
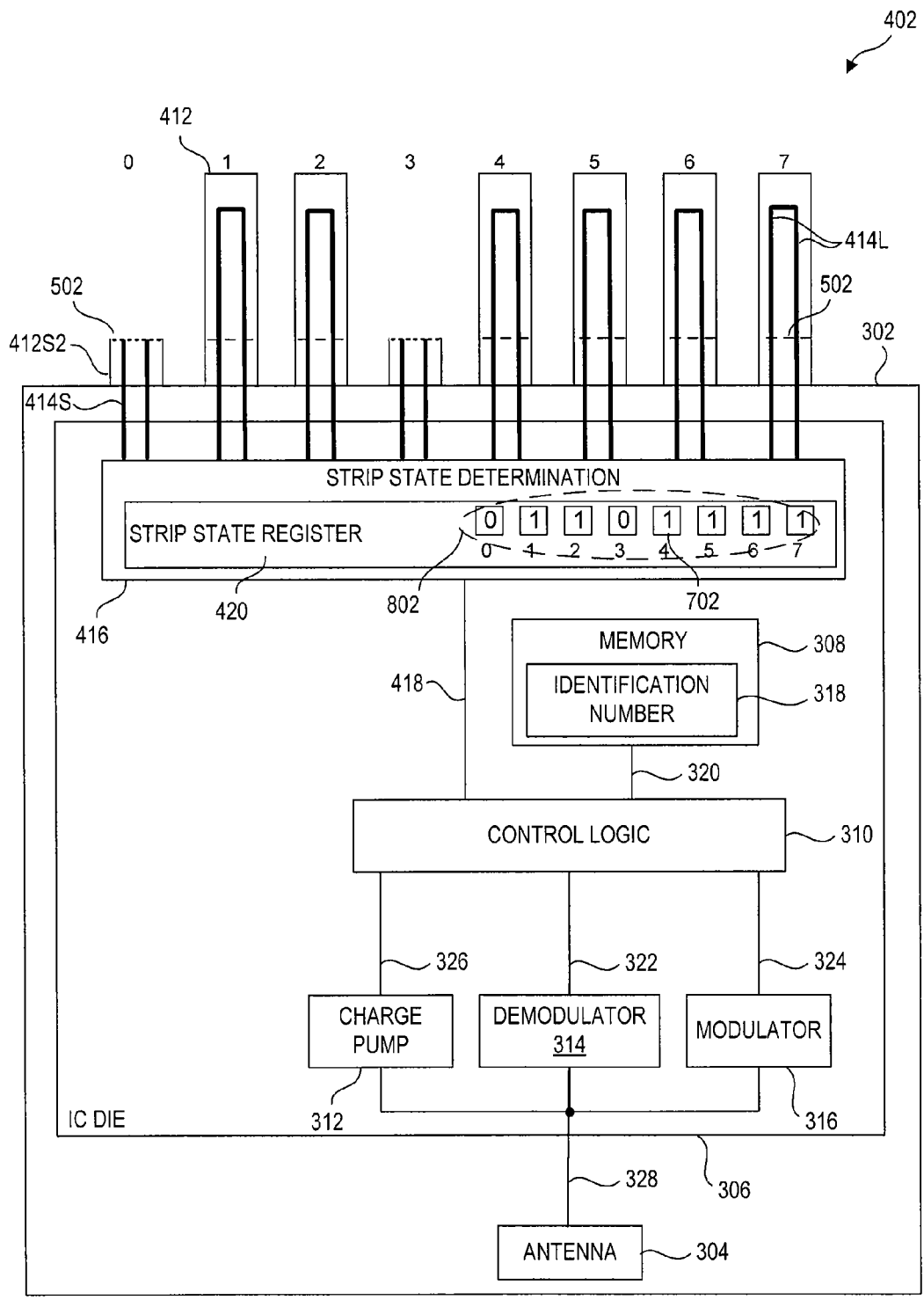
FIG. 9 shows another view of a block diagram of an exemplary mechanically programmable RFID tag according to the present system and method.

FIG. 9 is another view of exemplary RFID tag 402, further illustrating the exemplary system and method described in conjunction with FIG. 8. Some elements of exemplary RFID tag 402 described in conjunction with FIG. 9 are the same as those elements previously described above, and description of those elements will not be repeated.

In FIG. 9, of the eight strips 412, both strip 0 and strip 3 have been mechanically modified, and specifically have been torn at perforations 502. So, strips 0 and 3 are torn, where strips 1, 2, 4, 5, 6, and 7 remain intact. It can further be seen that strip state determination module 416 has detected the condition of the strips and that this is reflected in strip state register 420.

Specifically, strip state register 420 shows a bit pattern 802 (reading from left to right): "0, 1, 1, 0, 1, 1, 1, 1" wherein this bit pattern 802 corresponds to the status of strips 412, and wherein a "0" indicates a torn or modified strip and a "1" indicates an intact strip. In this way, bit pattern 802 reflects the status of strips 412. Persons skilled in the relevant art will recognize that other patterns of strips 412 as intact or torn can be similarly represented in bit pattern 802 of strip state register 420.

In addition to the capability to simply detect the state of the strips 412 and to reflect that state in strip state register 420, strip state determination module 416 and/or control logic 310 of RFID tag 402 may be further configured for additional forms of detection and processing.

For example, strip state register 420 and/or control logic 310 may be configured to detect a particular bit pattern of strip state register 420, and further be configured to report or to send an alert or an alarm to an RFID reader upon a detection of a preprogrammed bit pattern. Such a pattern may be stored in memory 308, having been transferred to exemplary RFID tag 402 from an RFID reader in a manner well known in the art. For example, control logic 310 or strip state determination module 416 may be configured to compare the bit pattern 802 of strip state register 420 to a previously stored bit pattern, and upon detection that the two are the same, may send an alert to an RFID reader.

Similarly, algorithms or logic which may be programmed into control logic 310 or strip state determination module 416 may be used to determine an order in time or a sequence in time in which strips 412 are modified. Control logic 310 or strip state determination module 416 may be further configured to send an alert or alarm if strips 412 are modified in a specified order, or if strips 412 are modified in an order other than a preferred order. As will be described further below, such a feature may be valuable for process control purposes.

6. CHANGING VALUES ASSOCIATED WITH STRIPS OF EXEMPLARY RFID TAGS

Figure 10:
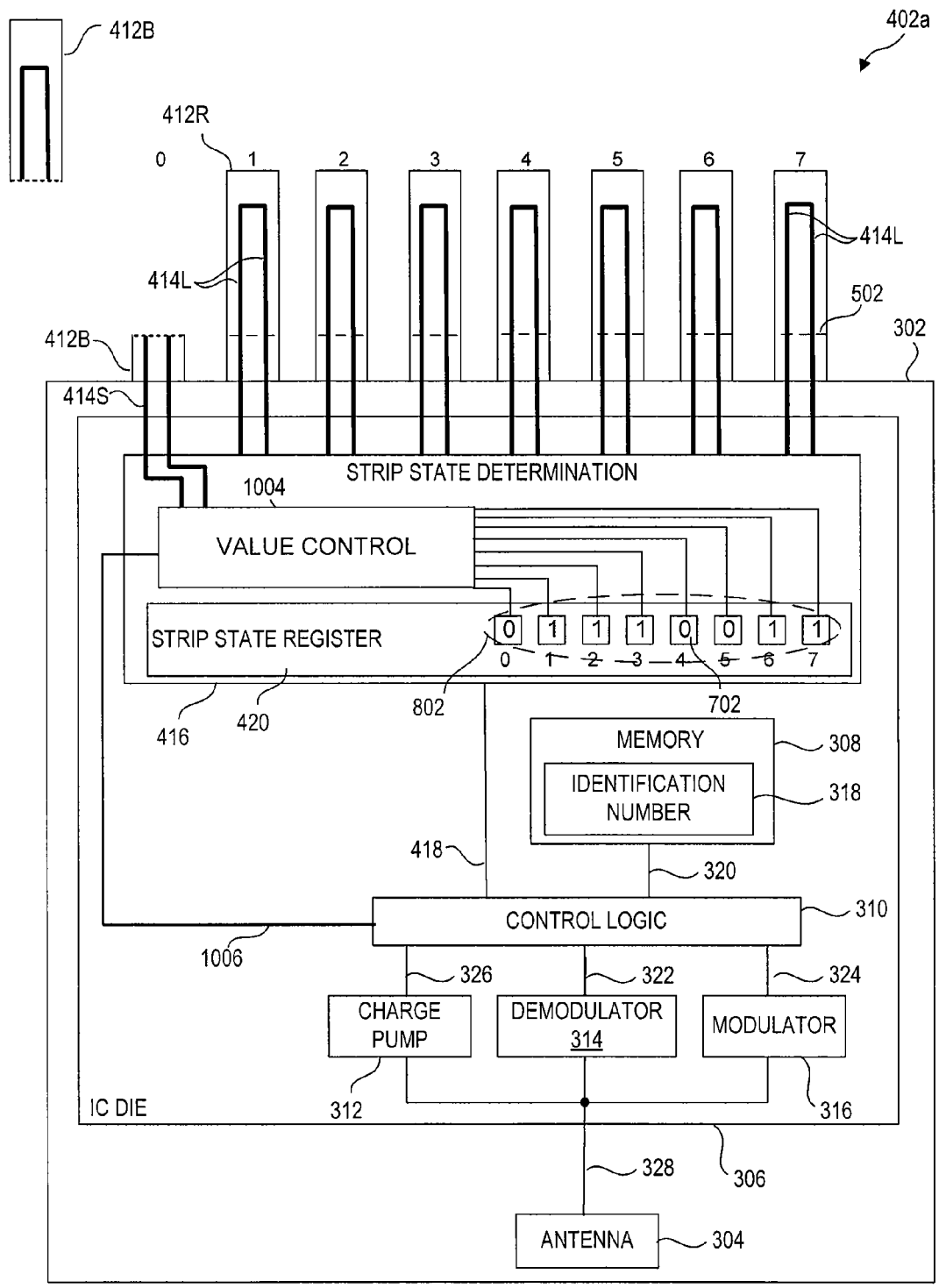
FIG. 10 shows another view of a block diagram of an exemplary mechanically programmable RFID tag according to the present system and method.

FIG. 10 illustrates another exemplary embodiment of an RFID tag 402a according to the. Exemplary RFID tag 402a has some elements in common with tags 102 and 402 already described above, and a discussion of these elements will not be repeated.

Exemplary RFID tag 402a has a bit value control module 1004. In one embodiment, bit value control module 1004 may be separate from control logic 310, and may for example be part of strip state determination module 416, and may further be coupled to control logic 310 via a bus 1006 or via other means. In an alternative embodiment, bit value control module 1004 may be a part of control logic 310, or may be implemented via logic within control logic 310.

As noted above, bits 702 of strip state register 420 may have a default value which is associated with an intact strip 412. For example, for a bit 702 corresponding to a strip 412, a bit value of "1" may be the default value indicating an intact strip 412, while "0" may indicate a ripped or torn strip 412S.

For some purposes however, it may prove useful to change the default values associated with some or all bits. In one embodiment, a control message may be sent from an RFID reader to RFID tag 402a, the message being received in the conventional manner via antenna 304, processed through demodulator 314 and control logic 310, and then sent via bus 1006 to bit value control module 1004. The message may indicate that certain bits 702 are to have a default value of "0" instead of "1". Or, if the initial standard default value for an intact strip 412 happens to have been "0", such a message may tell bit value control module 1004 to change the default value from "0" to "1". Under either set of circumstances, a simple radio control message may be used to change the default value of some or all of bits 702 of strip state register 420.

In an alternative embodiment, one or more of strips 412 may be used to change the default values of the bits 702 in strip state register 420. For example, a bit control strip 412B ("B" standing for "bit") may be used to change the default values of some or all of the bits in strip state register 420. In one embodiment, the effect of mechanically modifying bit control strip 412B may be hard coded or pre-wired into the control logic of exemplary RFID tag 402a. In that case, mechanically modifying the appropriate bit control strip 412B, such as by severing bit control strip 412B, will have a predetermined effect of changing the default value of specified bits 702 of strip state register 420.

In an alternative embodiment, aspects of both of the previously described methods may be combined. For example, first, a message may be received at RFID tag 402a via a radio frequency link, wherein the message indicates which of the bits 702 of strip state register 420 may have their default values modified. However, upon receipt of this message, the default values of the associated bits 702 are not modified. Instead a reference to the appropriate bit addresses and new default values is stored in a non-volatile memory associated with memory 308. At a later time, if a user chooses to modify the default values of the bits according to the previously provided instructions, the user may elect to tear the appropriate bit control strip 412B. Only at that time will the default values of the designated bits 702 of strip state register 420 actually have their default values changed.

As can been in the exemplary RFID tag 402a illustrated in FIG. 10, when strip 412B (shown here as the 0 strip) is mechanically modified, its associated bit 702 may be modified as well, changing from "1" to "0". In addition, it may have been preprogrammed via a radio frequency message that bits 702 at bit addresses 4 and 5 should have their default states changed from 1 to 0. Therefore, even though strips 412 number as strips 4 and 5 remain intact, a new default value of "0" is shown for bits 702 at bit addresses 4 and 5 in strip state register 420.

In an alternative embodiment, it may be possible to set a state of a bit 702 such that the bit 702 stays at a fixed value (for example, "0" or one (1)) irrespective of whether the associated strip 412 is physically modified. Analogous to description already presented above, such a condition may be directly programmed via an RF link to tag 402. Alternatively, such a condition may be preprogrammed as a possible state of tag 702, but may only be made an active state of tag 702 when triggered by a mechanical modification of a bit control strip 402B.

If a bit 702 is set to remain at a fixed value even when the strip 412 normally associated with that bit 702 is mechanically modified, then it may be that the bit 702 and the associated strip 412 have been effectively decoupled. In this sense, value control module 1004 may also be viewed as or may be working in conjunction with a bit/strip coupling control module, capable of decoupling and possibly recoupling a strip 412 and an associated bit 702. In an alternative embodiment, value control module 1004, further understood as a bit/strip coupling control module, may be further configured to reassign which bits 702 are associated with which strips 412.

Persons skilled in the relevant arts will appreciate that such bit/strip coupling control may be implement through a variety of means including, for example and without limitation, various configurations of logic gates, various circuit/memory element mapping schemes, and various forms of control logic. Further, such means may be implemented within strip state determination module 416, value control module 1004, control logic 320, other memory control circuits or modules (not illustrated), or similar components of IC 306, or through a combination of the above.

7. FURTHER EXEMPLARY RFID TAGS AND FEATURES THEREOF

Figure 11:
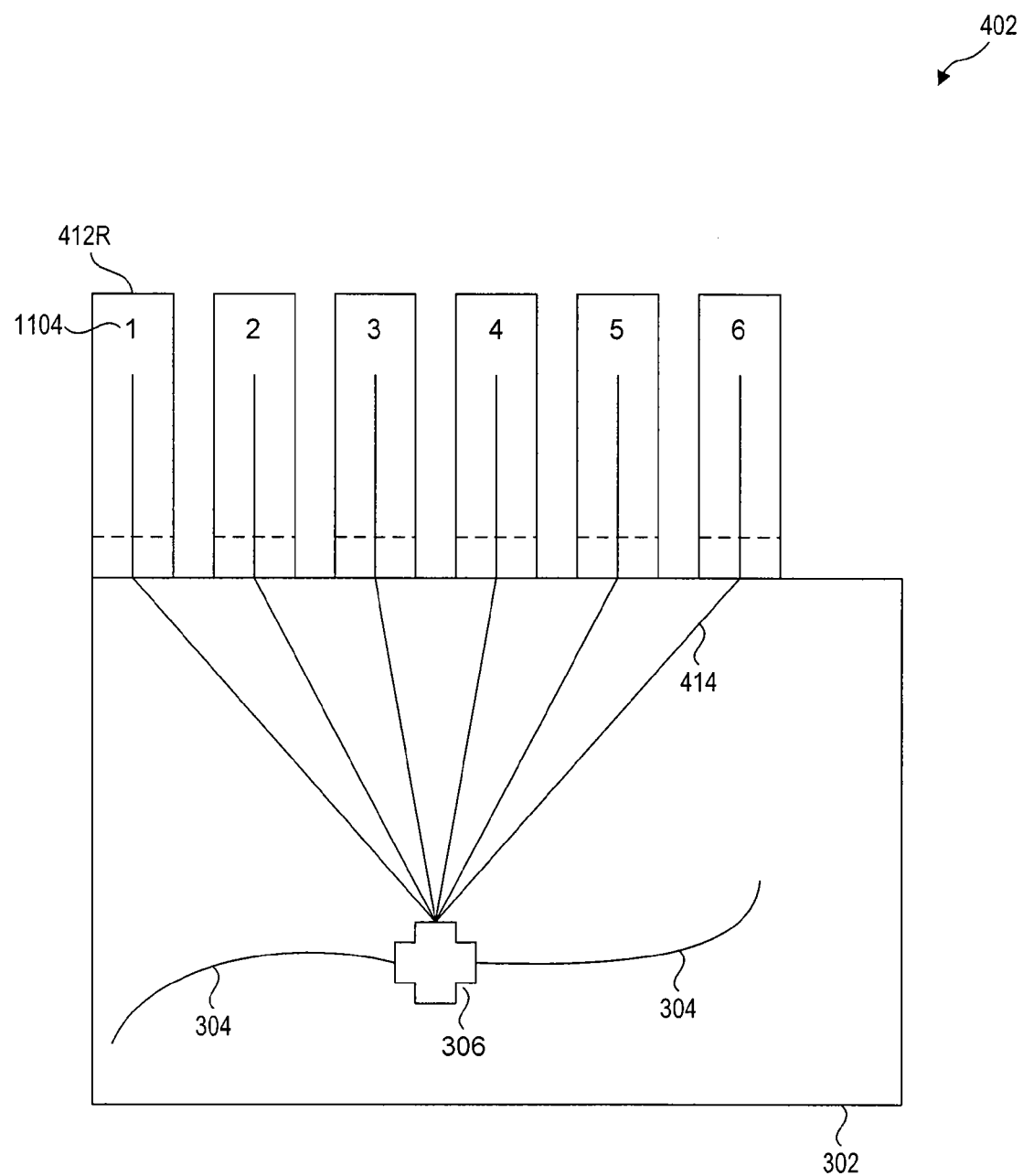
FIG. 11 shows an exemplary mechanically programmable RFID tag according to the present system and method.

FIG. 11 is another diagram of an exemplary RFID tag 402 according to the, presented in part to show the elements drawn approximately to scale. Seen in the figure is IC 306, antenna 304, conductors 414, substrate 302, and strips 412, which in this case are rip strips 412R. It can be further seen from the figure that the number of strips need not be eight strips, as were shown in the preceding figures. Shown here are six rip strips 412R.

Persons skilled in the relevant arts will appreciate that more or fewer strips may be used. Persons skilled in the relevant arts will also appreciate that the strips need not all be all on the same side of RFID tag 402, and indeed the strips may have different sizes in relation to each other or in relation to the tag as a whole. For example, an RFID tag 402 may have a single strip 412 on each edge of a rectangular substrate 302, for a total of four strips 412.

A strip 412 of exemplary RFID tag 402 may have a strip indicia 1104 (also referred to herein, synonymously, as "identifier 1104" or "labeling 1104"). Strip indicia 1104 may be associated with or used to indicate a purpose of strip 412. In one embodiment, strips 412 may come with a default strip indicia 1104 (for example, a factory-applied indicia or a manufacturer-applied indicia) which may, for example, be a simple numbering scheme such as that shown in FIG. 11. In this way each strip may be associated with a number, such as, '1', '2', '3', '4', '5', and '6'. Furthermore, a purpose or use with which each strip 412 is associated may be independently assigned the appropriate number corresponding to the strip 412. Other default strip indicia 1104, such as graphic symbols or color coding, may be employed as well.

In an alternative embodiment, strip 412 may be configured to accept alternative or additional strip indicia 1104. Such alternative or additional strip indicia 1104 may be applied by a user of RFID tag 402 in an office, factory, or other field setting, and may be referred to as "field-applied indicia" (also referred to herein, synonymously, as "field-applied identifier" or "field-applied labeling"). For example, it may be possible to write on strip 412 with a pen, pencil, or marker pen. Or it may be possible to actually attach a set of labels (for example, paper labels with adhesive backing) to strip 412. Such labels may be provided as part of a package with RFID tag 402. Other aspects of applying strip indicia 1104 to RFID tag 402 will be described further below in conjunction with FIG. 15 and FIG. 16.

Figure 12A:
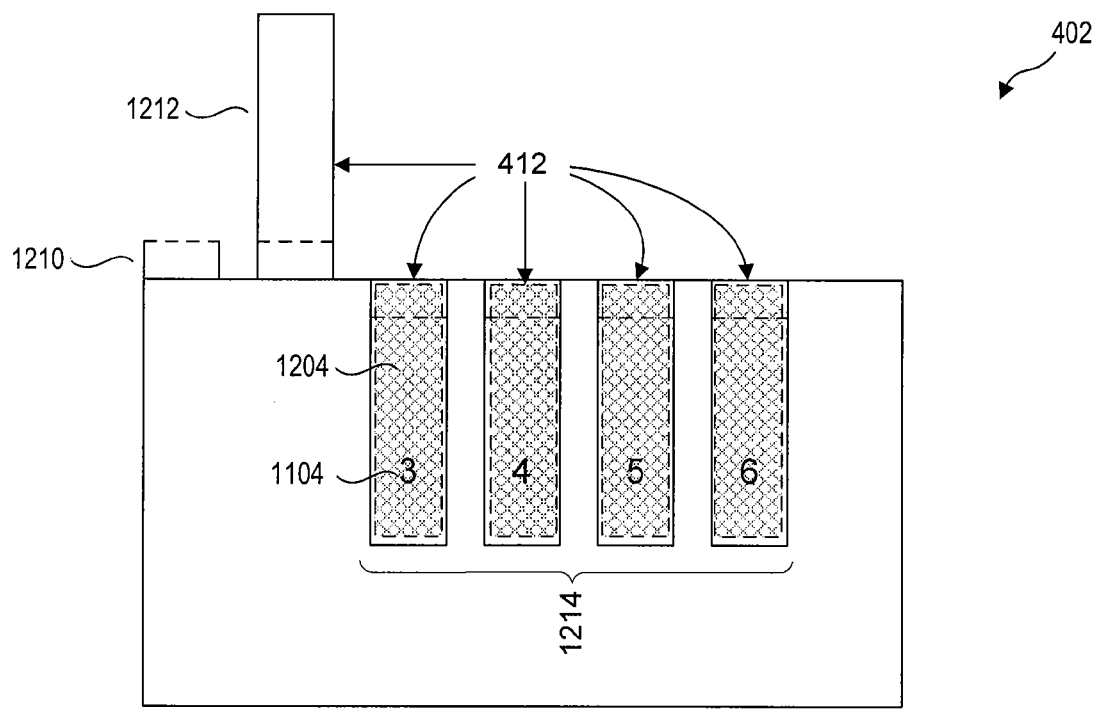
FIG. 12A shows another view of an exemplary mechanically programmable RFID tag according to the present system and method.

FIG. 12A illustrates a set of strips 412 where two of the strips have already been put into use, one of them (strip 1210) being illustrated as already ripped or torn, and another (strip 1212) in use or ready to be used but not yet torn, while four additional strips 1214 are flush against the substrate 302 of RFID tag 402.

In one embodiment, it may be possible to use an adhesive substance (not shown) to hold the strips 412 against substrate 302 of RFID tag 402, so that the tags may be held out of way until they are put into use. In addition, an adhesive 1204 may be placed on the exposed side of strips 412 for use in attaching the strips 412 to items or objects to be monitored. Such an adhesive 1204 may be covered by a piece of protective material (not illustrated), which may be removed by a user. In an alternative embodiment, the same adhesive which is used to hold strip 412 against substrate 302 may also be used to hold strips 412 against items or objects to be monitored.

Adhesive 1204 may enable a strip 412 to be attached to an object, so that the object may be monitored via strip 412. In other words, by physically attaching strip 412 to an object by means of the adhesive substance, a movement or change of the object may result in a tearing or other physical alternation of strip 412. In that way, the movement or change of the object can directly trigger the mechanical change of strip 412, and hence signal that the object has been moved or modified.

Figure 12B:
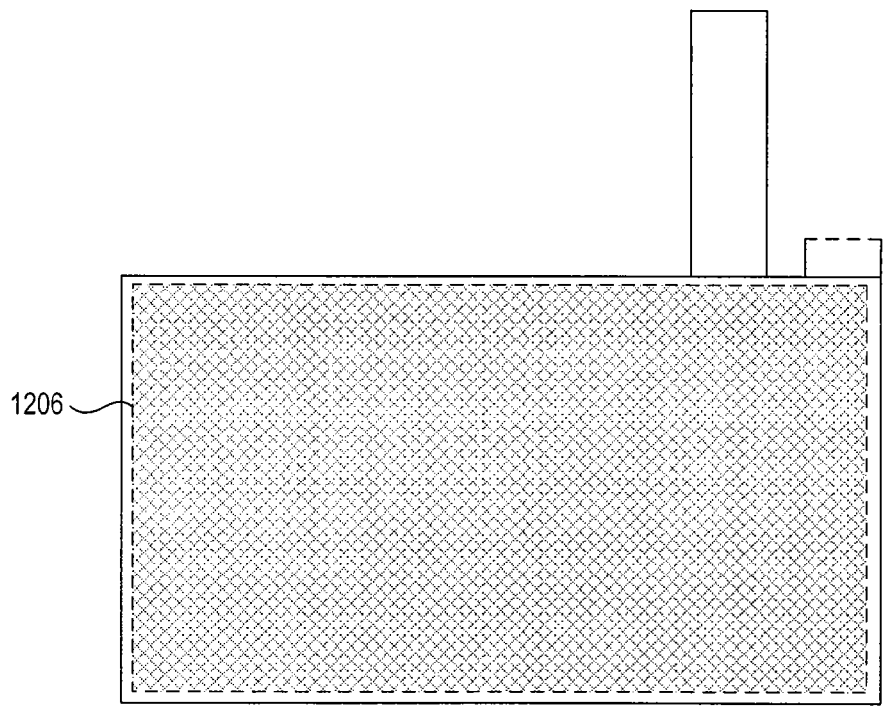
FIG. 12B shows another view of an exemplary mechanically programmable RFID tag according to the present system and method.

FIG. 12B presents another view of exemplary RFID tag 402, this view showing a reverse side from the side shown in FIG. 12A. The side shown in FIG. 12B may be an entire adhesive surface 1206, which may be then used to attach the entire RFID tag 402 to an item to be monitored. A cover (not shown) may be provided to protect adhesive 1206 until it is put into use. This cover may be provided on top of RFID tag 402. The cover may then be stripped away at such time as RFID tag 402 is to be put into use and attached to an object.

Figure 13:
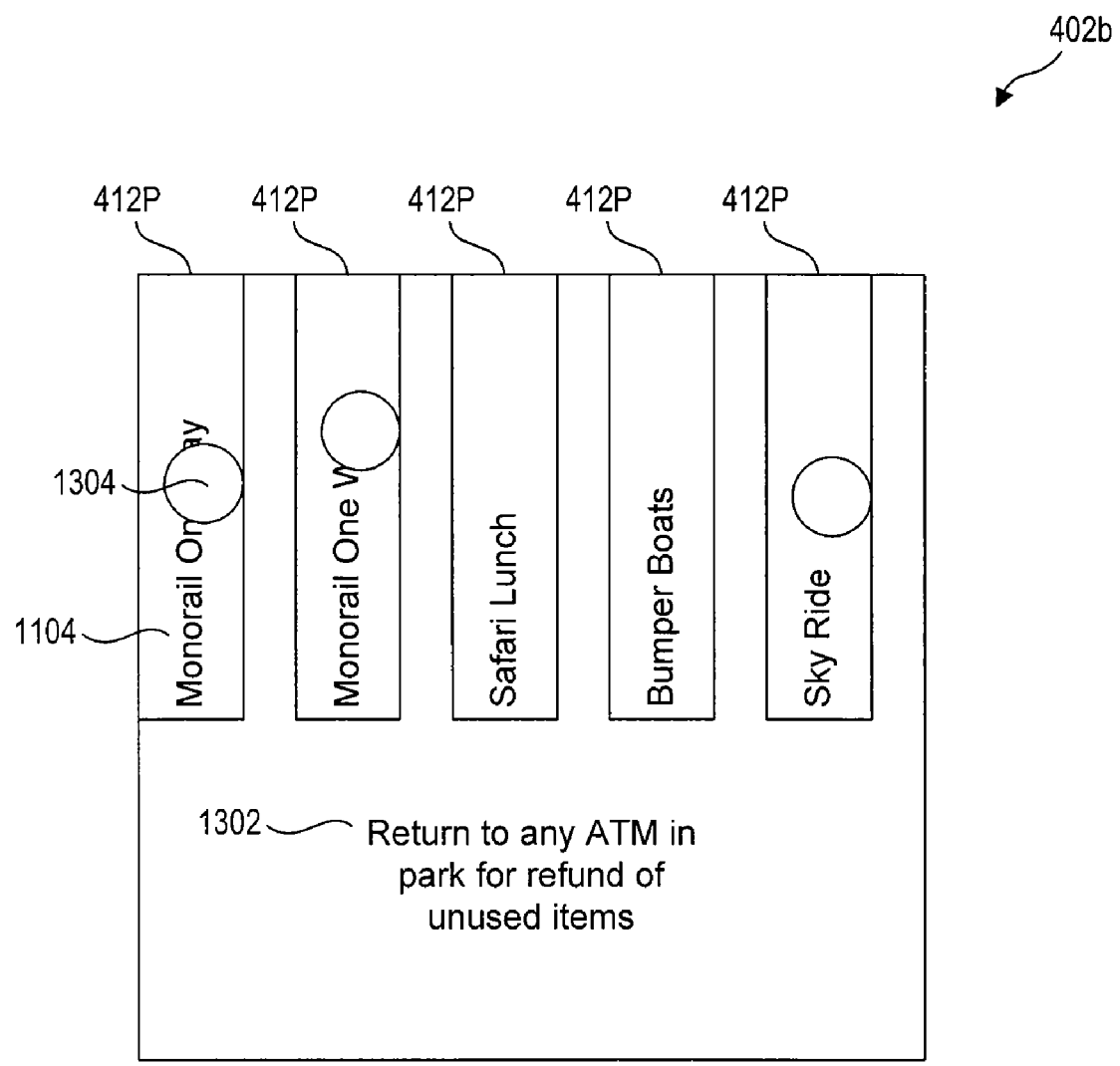
FIG. 13 shows another view of an exemplary mechanically programmable RFID tag according to the present system and method.

FIG. 13 shows another exemplary RFID tag 402b embodiment. Exemplary RFID tag 402b may be presumed to be similar in many respects to exemplary RFID tags 402 already described above. However, RFID tag 402b does not employ tearable strips 412. Instead, RFID tag 402b may employ punchable strips 412P. It will be apparent to persons skilled in the relevant arts that punchable strips 412P would be similar in many respects to tearable strips 412R. In particular, punchable strips 412P would have running through them or along their surface a conductor 414 (not shown in FIG. 13), where the continuity of conductor 414 results in a first state of an associated bit, and a discontinuity of conductor 414 results in a second state of an associated bit.

In the case of a punchable strip 412P, the discontinuity of associated conductor 414 is achieved by physically punching a hole 1304 in the strip 412P. Because punchable strips 412P do not need to be torn, they therefore do not need extend from the substrate 302 of the RFID tag. Instead, punchable strips 412P may serve simply as an extension of substrate 302 or may be continuous with substrate 302 of RFID tag 402b. However, in an alternative embodiment, punchable strips 412P may extend from substrate 302 in a manner similar to that seen previously for rippable strips 412R.

A tag indicia 1302 may be present to provide instruction or some message. Tag indicia 1302 may indicate a purpose or use of tag 402, or may indicate a means for altering the tags, such as punching it or tearing a strip, or tag indicia 1302 may provide other useful information to a user of tag 402. Tag indicia 1302 may be affixed by means of a physical label (for example, a paper label with an adhesive backing) which is attached to RFID tag 402. Tag indicia 1302 may be physically printed on RFID tag 402 using ink. Tag indicia 1302 may be hand written or drawn onto RFID tag 402.

8. APPLICATIONS OF EXEMPLARY CUSTOMIZABLE, MECHANICALLY PROGRAMMABLE RFID TAGS

FIG. 13 further illustrates a practical application of the present system and method. Exemplary RFID tag 402b may be used for keeping track of a patron's activities in an amusement park or similar environment, such as a zoo or other entertainment setting. As another example, a user may purchase a ticket which may cover a full price of all possible activities that the user might choose to engage in during a day at a park or amusement center. Each user is also issued a physical ticket in the form of RFID tag 412b, which has suitable strip indicia 1104 imprinted on it for each possible ride or event. As the user participates in the various activities, such as a monorail ride or a sky ride, a ticket taker at each activity or event does not need to actually accept money from the patron. Furthermore, there is no need to actually have an RFID reader at each location to record the patron's activity, which saves significant expense. Instead, as the user participates in an event, such as a monorail ride or sky ride, the appropriate matching strip 412 is punched.

At the end of the day, and as per instructions in tag indicia 1302, the user returns to an ATM machine for a refund for unused items. The user brings the tag 402b, which is also their ticket to the ATM machine. The ATM machine detects which holes 1304 have been punched and which have not been punched. The unpunched holes (in this case, the safari lunch and the bumper boats) indicate events, services, or activities which the patron did not take advantage of. The ATM machine can then calculate an appropriate refund due to the patron and provide the patron with that refund.

A feature described above in conjunction with FIG. 10, namely the feature of changing default bit states or fixing a bit state associated with strips 412, may be utilized in these circumstances. For example, although not illustrated, it is possible that the user may show up at the park with a discount ticket which entitles him or her to take certain rides or participate in certain events for free. In that case, it may be desirable to set a default state of a bit to a different value, or fix the value of a bit, and thereby indicate that a particular event is for free for that patron.

Figure 14:
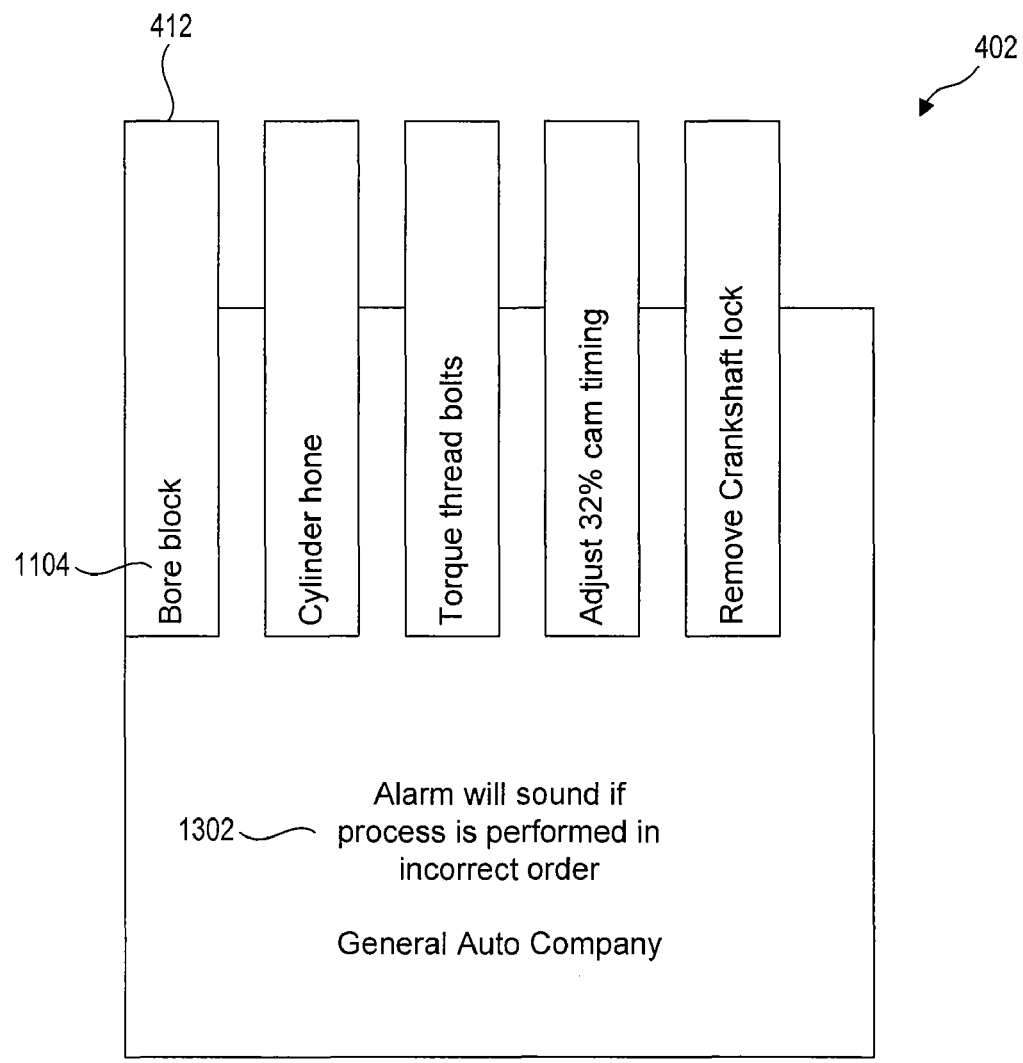
FIG. 14 shows another view of an exemplary mechanically programmable RFID tag according to the present system and method.

FIG. 14 illustrates another exemplary application of an RFID tag 402. For the application shown, it may not matter whether strips 412 are rippable strips or punchable strips. In some embodiments, it may be possible to use punching on strips 412 on which are otherwise rippable.

FIG. 14 shows an exemplary tag useful in an assembly line process, perhaps one associated with automobile repair or automobile assembly. Strip indicia 1104 on each of the strips 412 indicates the specific stages of the process. Tag indicia 1302 indicates the result that will occur. Specifically, tag indicia 1302 indicates that an alarm will sound if a process is performed in an incorrect order. In this way, the capacity of tag 402 to be programmed for a desirable tearing order of the strips (or punching order of the strips) can be used to monitor a process and make sure that steps are performed in a correct order.

In a default configuration it may be that RFID tag 402 expects strips 412 to be torn in a fixed order from left to right, or from a strip numbered from 1 up to a highest number strip. However, in one embodiment, the desired order may be modifiable via RF programming.

As indicated above, an advantage of the present system and method is the capability of applying labeling 1104 or otherwise utilizing indicia 1104 on strips 412 in such a way as to indicate a meaning, purpose, or use of each strip 412. As already noted, strip indicia 1104 may be factory-or-manufacturer applied to RFID tags 402, or may be field-applied by a user of RFID tags 402.

Strip indicia 1104 may be applied in any of a variety of ways. As already noted, strips 412 may come pre-manufactured with a default strip indicia 1104, which may for example be a simple numbering. For example, if there are eight strips 412 associated with tag 402, each strip 412 may be labeled with a number 1-8. In addition, for purposes of individual applications, it may be possible to apply a tag indicia 1302 or strip indicia 1104 to an individual tag 402 or strips 412 of a tag with text, lettering, or other indicia by hand using a pen or pencil or a marker pen.

Yet another means to apply indicia 1104, 1302 to a tag 402 may be via custom labels. For example, labels similar to those used for mailings for envelopes or similar purposes may be provided. However, these labels may be custom designed to be an appropriate size to be affixed to strips 412 or substrate 302 of RFID tag 402. These labels could be part of a sheet of labels of the kind which may be fed through a laser printer or an ink jet printer, so that large numbers of labels could be mass printed and then affixed to the appropriate strips 412 or substrate 302 of RFID tag 402.

In an alternative embodiment, and with the emergence of thin film flexible microprocessors, it may be possible to actually design RFID tags 402 according to the present system and method where the tags themselves come affixed to sheets, where the sheets may be feed through either ink jet printers, laser printers, or similar printers. In that event, and optionally with the help of pre-designed templates for use with a word processing program or similar software, appropriate indicia 1104, 1302 could be generated on a computer screen and then printed directly onto the RFID tags 402 of the present system and method.

Figure 15:
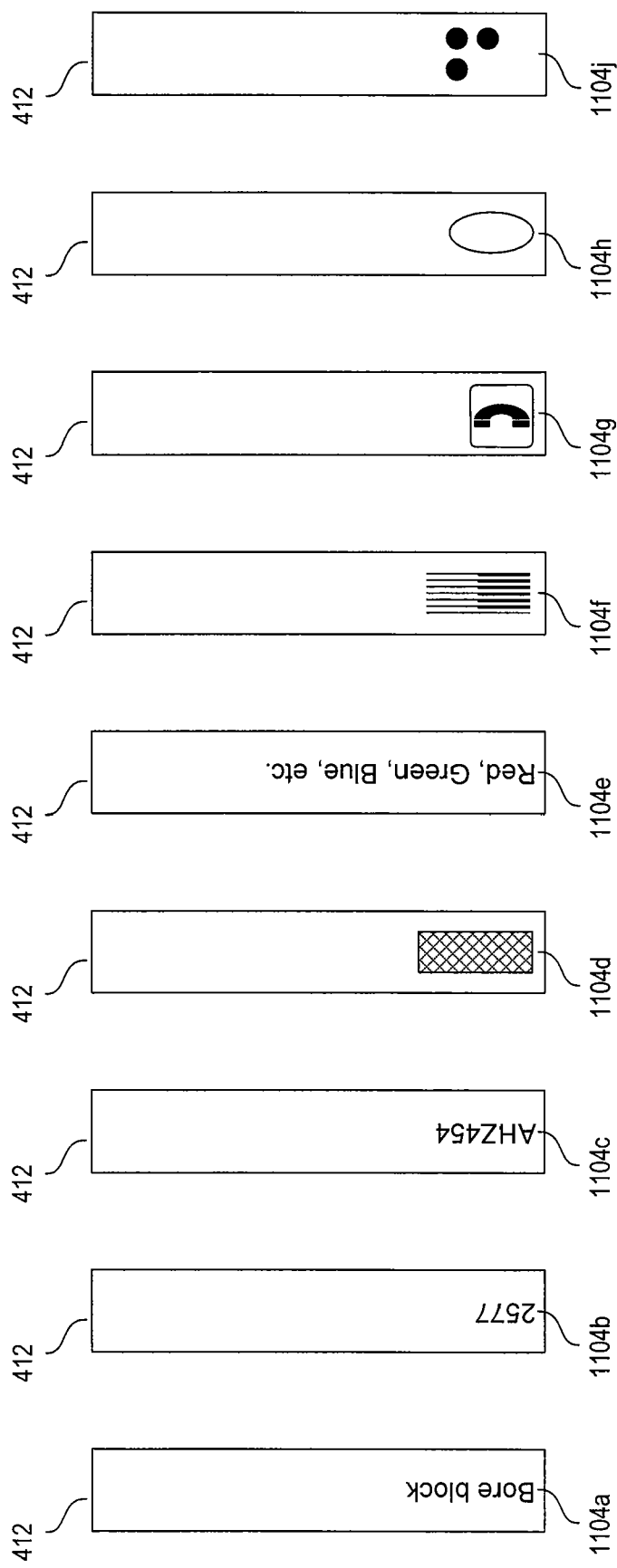
FIG. 15 shows a view of exemplary mechanically alterable elements of an exemplary mechanically programmable RFID tag according to the present system and method.

FIG. 15 illustrates exemplary strip indicia 1104 which may be employed. These include: text, shown as 1104A; numbering 1104B; special codes 1104C; special patterns 1104D; colors 1104E (represented here by the words 'Red', 'Green', 'Blue', etc., but in actual application actual colors may be used); bar codes 1104F; symbols 1104G; and geometric figures 1104H. Also employable for the present purpose may be tactile indicators 1104J. For example, raised dots (illustrated as three dark round dots) of the kinds used for brail may be employed as indicia or labeling on the strips 412 of the RFID tags 402. Other strip indicia 1104 may be employed as well.

Figure 16:
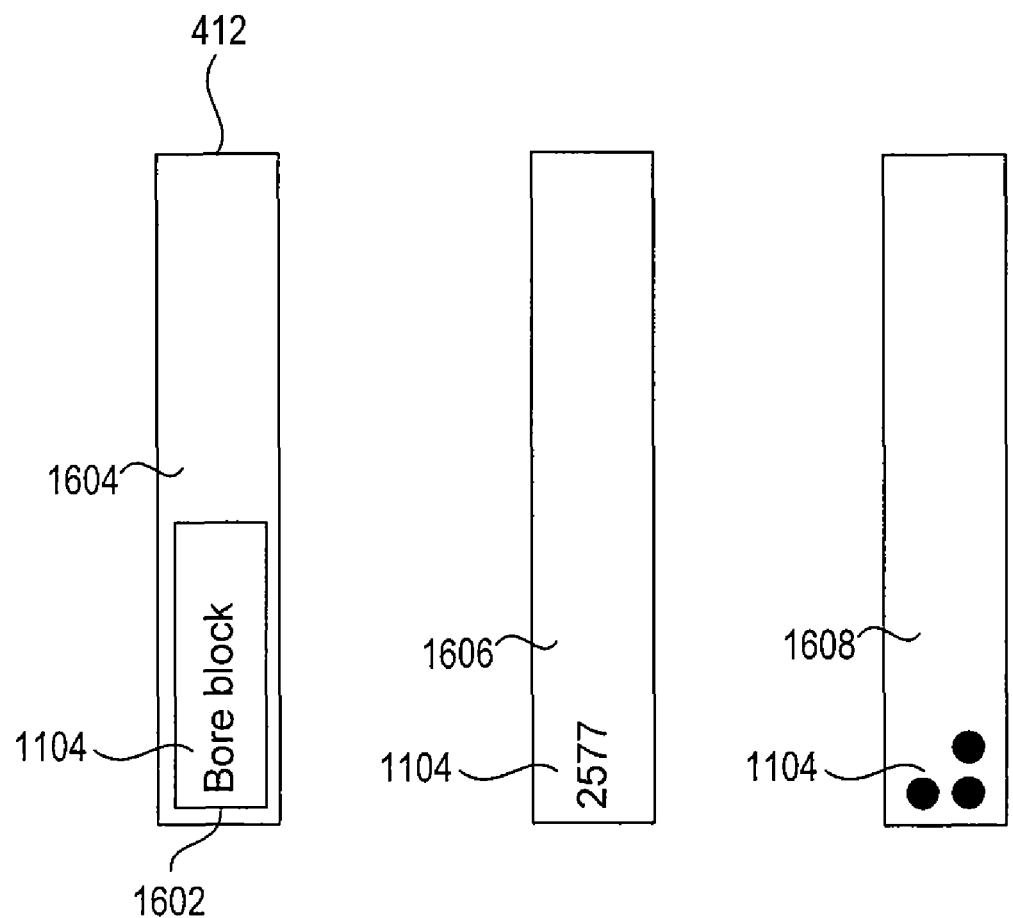
FIG. 16 shows another view of exemplary mechanically alterable elements of an exemplary mechanically programmable RFID tag according to the present system and method.

FIG. 16 illustrates some exemplary specific ways in which strip indicia 1104 may be attached to strips 412. For example, a label 1602 may be attached to a label receiving surface 1604 of a strip 412. Similarly text may be imprinted directly onto a printable surface or text receiving surface 1606 of a strip 412. Finally, a malleable, ductile, moldable, or pliable surface 1608 of a strip 412 may be impressed with the imprint of a texture or demarcation that can be sensed in a tactile manner. Alternatively, raised elements or other tactilely-sensible elements may be attached to surface 1608 via glue, adhesive, or other means.

In an embodiment, RFID tag 402 proper may be supplied with a sheet or sheets of factory-labeled labels of a size suitable for attachment to strips 412 and to the substrate 302, where such labels may come with preprinted text, symbols, color markings, geometric shapes, icons, or other indicia like those described above, suitable for a variety of applications.

9. METHODS ASSOCIATED WITH CUSTOMIZABLE, MECHANICALLY PROGRAMMABLE RFID TAGS

Figure 17:
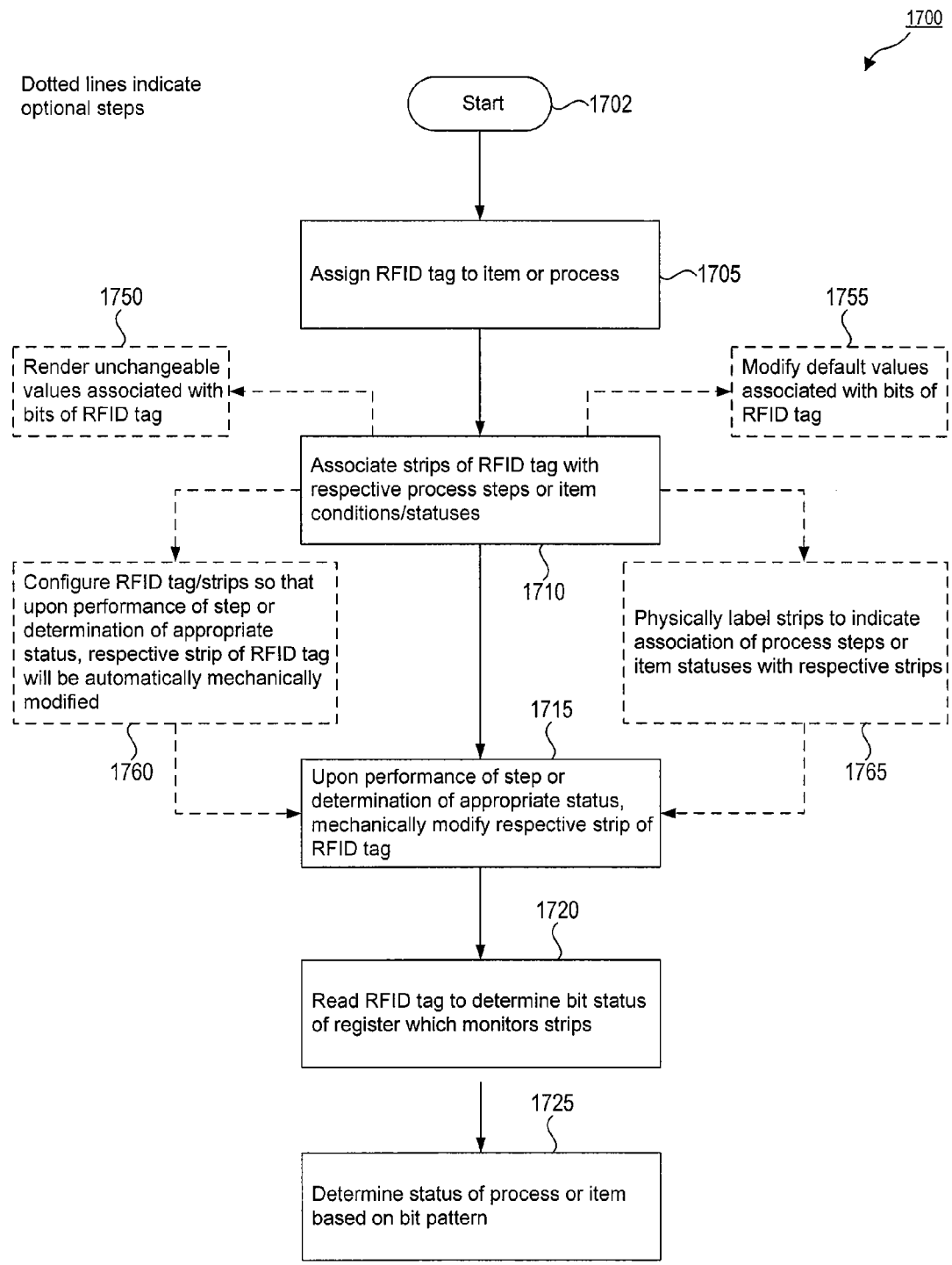
FIG. 17 is a flow chart of an exemplary method for monitoring an item status or process steps with an exemplary mechanically programmable RFID tag according to the present system and method.

FIG. 17 is a flow chart of an exemplary method 1700 to monitor a status of an item or to monitor a process using a customizable, mechanically programmable RFID tag. Method 1700 may entail certain optional steps which will be covered after covering the primary steps. The method begins at step 1702.

At step 1705 an RFID tag 402 is assigned to the item or process. In the case of an item, assigning the RFID tag 402 to the item may entail at some point physically attaching the RFID tag 402 to the item. The RFID tag 402 may be of the type described above in conjunction with various figures, including FIG. 12A and FIG. 12B which illustrate the use of adhesives for purposes of attaching RFID tags. Assigning an RFID tag 402 to a process may in practice entail placing the tag in possession of person monitoring the process. It may instead entail affixing the tag to a monitoring device associated with the process, or to an assembly line associated with the process, or to a monitoring station associated with the process, or to some type of conveyance associated with the process.

Step 1710 entails associating strips 412 of RFID tag 402 to process steps or with conditions or statuses of the item.

In step 1715 of method 1700, upon performance of a step or upon determination of an appropriate status of an item, a mechanical modification is made to the appropriate strip 412 of RFID tag 402. For example, an appropriate strip 412 may be torn or punched to indicate the performance of the step or the determination of the appropriate item status.

In step 1720, which may be performed at the conclusion of an entire process or may be performed repeatedly, RFID tag 402 is read, typically with an RFID reader, to determine the bit status of the register 420 which monitors the strip 412.

Finally, in step 1725 a determination of the status of the process or item is made based on bit pattern 802. This determination may be made by a person or by automated software or by other means.

Method 1700 of monitoring an item's condition or monitoring process steps has several optional steps. As already noted above, step 1710 (which is a non-optional step) entails associating strips 412 of RFID tag 402 with respect to process steps or item conditions/statuses.

Following step 1710, in step 1750 it may be desired to render unchangeable the values associated with certain bits of RFID tag 402. Thus, RFID tag 402 may have logic which enables tag 402 to be programmed in such a way that specific bits will not change values even when the associated strip 412 is mechanically modified. Similarly, in optional step 1755 the default values associated with bits of RFID tag 402, where those bits in turn are associated with strips 412, may be set so that their default values are changed from the original default values (for example, factory-set default values) to new default values.

As an example of the application of these optional steps, consider for example an assembly line process where a part is to be modified in a certain way according to steps which we may label A, B, C and D. Suppose at some point that a change is made to the parts which are ordered as part of the assembly line process. As a result of the change in the order, the parts are now delivered with a result of step B already completed as the parts are delivered to the assembly process. That is, the parts as ordered from a manufacture may have already had step B applied to them.

It is therefore desirable that RFID tags 402, which may already have been customized for the application at hand, should have the appropriate strip 412 torn, such as a strip 412 which may correspond to step B. However, there is the possibility that users may neglect to tear the strip 412 associated with step B, and thus may fail to indicate that step B was already applied to parts as delivered. A way to avoid this problem is to program the RFID tags 412 in advance. Specifically, the RFID tags 412 may be programmed such that the bit 702 associated with the second strip, and therefore with step B, is automatically and permanently set to an unchangeable value which indicates that step B was inherently completed (since the parts were delivered with step B already applied).

In optional step 1760 of method 1700, which may follow step 1710 and precede step 1715, RFID tag 402 or strips 412 of tag 412 may be configured so that upon performance of a step, or upon determination of an appropriate status, an appropriate respective strip 412 of RFID tag 402 will be automatically mechanically modified. In this way it is possible to that no human intervention may be needed to modify tag 402 upon the performance of the step or upon determination of the appropriate status of an item.

In optional step 1765 of method 1700, which may follow step 1710 and precede step 1715, strips 412 of tag 402 may be labeled to indicate an association between the strips 412 and particular process steps or an association between strips 412 and specific items statuses or item conditions.

Figure 18:
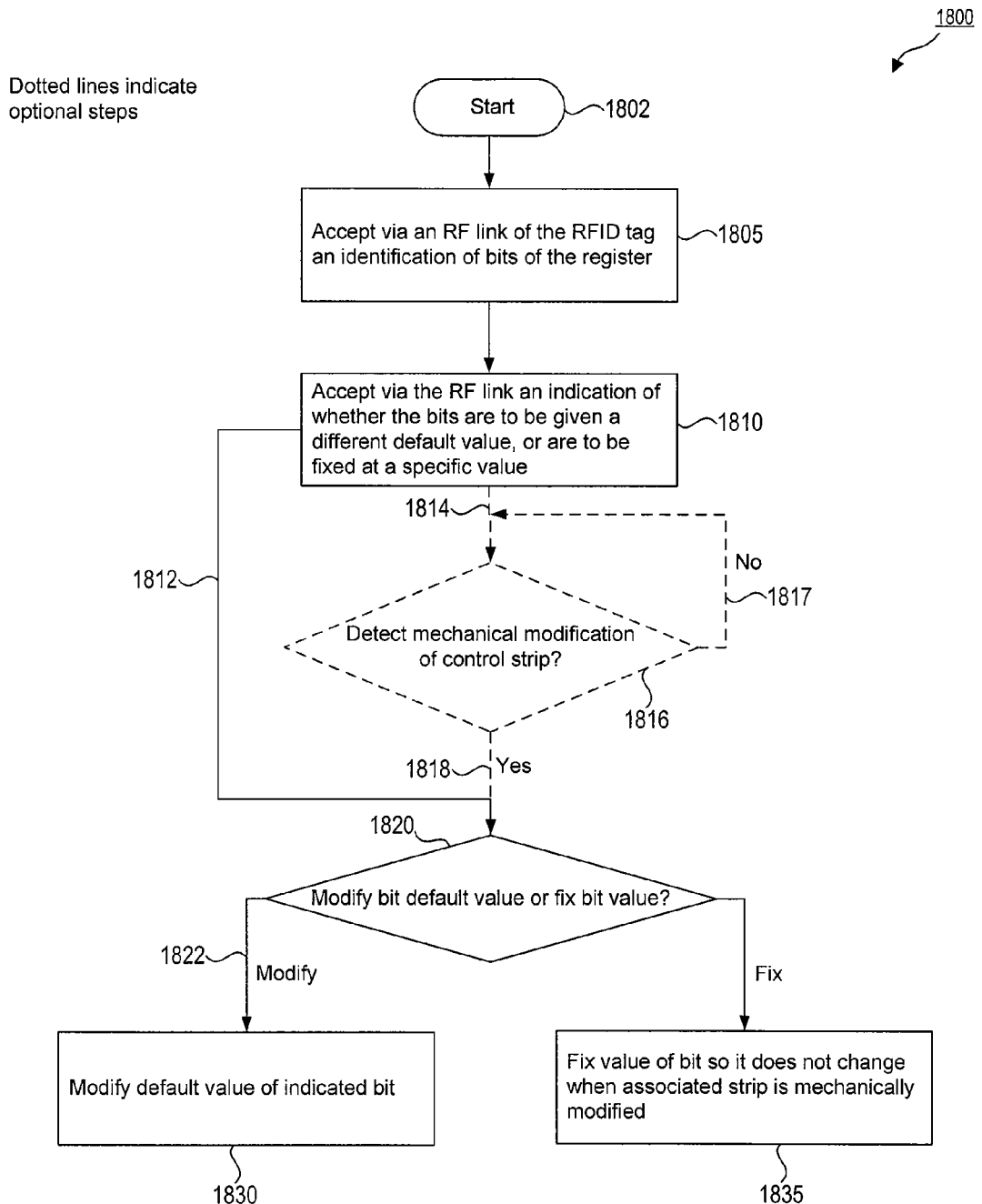
FIG. 18 is a flow chart of an exemplary method for using a radio frequency (RF) signal to modify the values or the default values of bits associated with exemplary mechanically modifiable elements of an exemplary mechanically programmable RFID tag according to the present system and method.

FIG. 18 is a flow chart of an exemplary method 1800 which illustrates in more detail the steps that may be entailed in steps 1750 or step 1755 of method 1700, wherein one or more bits 702 of RFID tag 402 may be set to fixed values or may have their default values changed.

In an exemplary embodiment, method 1800 starts at step 1802.

In step 1805, RFID tag 402 may accept via a radio frequency link an identification of a bit or bits 702 of strip stage register 420.

In step 1810, RFID tag 402 may accept via the same radio frequency link an indication of whether the designated bits 702 are to be given a different default value from the standard default value (for example, a factory preset default value), or whether those bits 702 are to be fixed permanently at a specific value irrespective of whether the associated strip 412 is mechanically modified.

In one embodiment of method 1800, the method continues along path 1812 to arrive at decision 1820. At 1820 a decision is made as to whether the indicated bits 702 are to be assigned a new default value, or whether the indicated bits are to be assigned a fixed (that is, an unchanging) bit value.

Path 1822 indicates the case where the default value of the indicated bits 702 is to be modified. At step 1830 the RFID tag 402 modifies the default value of the indicated bit or bits 702. If at decision box 1820, it is determined that the indicated bits 702 are to be assigned a fixed bit value 702, the method continues according to path 1824. Path 1824 leads to step 1835. In step 1835 the value of the indicated bits 702 is fixed so that the bit or bits 702 do not change even when the associated strip 412 is mechanically modified.

Returning to step 1810, and in an alternative embodiment, the method of 1800 may continue along path 1814. Here, at decision step 1816, a determination has to be made as to whether or not the indicated changes to the bit or bits 702 should be applied at all. The decision is made based on the condition of a designated bit control strip or factory-determined bit control strip 412B. A detection is made as to whether or not there has been a mechanical modification, such as a punching or tearing, of the bit control strip 412B.

If bit control strip 412B has not been mechanically modified (that, torn, ripped, punched, etc.), the method continues along the path of 1817 where the mechanical condition of the bit control strip continues to be monitored. That is to say, step 1816 continues to loop and make a determination as to the status of the bit control strip 412B. If the bit control strip 412B has been mechanically modified, method 1800 continues along path 1818. This arrives again at decision box 1820, already described above, where a determination is made as to whether to modify the default value of the bits 702 or to fix the default value of the bits 702.

Persons skilled in the relevant arts will recognize that the exact steps described for methods 1700 and 1800, as well as the order in which the steps are performed, are exemplary only. Methods 1700 and 1800 may be modified in various respect, including having more or fewer steps, and have steps performed in an order other than that illustrated, while still remaining within the scope and spirit of the.

10. ALTERNATIVE EMBODIMENTS

The invention has been described with respect to a number of exemplary embodiments. Alternative embodiments may be envisioned within the scope and spirit of the invention as described herein, and as further defined by the appended claims. Some of these alternative embodiments are described below.

The operation of the invention has been described with respect to a register comprised of a number of bits 702, wherein each bit of the register 420 corresponds to a mechanically modifiable element 412 of the RFID tag 402. Persons skilled in the relevant arts may associate the concept of a "register" with specific types of memory registers well known in the art, which are frequently used in computer hardware and similar technologies. For example, registers may be comprised of a series of bits wherein each bit value may be represented by an electrical state of a transistor or capacitor, or a magnetic state of a magnetically active material, or similar electrical or physical state of a hardware component.

It should be understood that a register is any type of electronic circuit or any configuration of electronic elements which may be configured to represent a state of a mechanically modifiable element. Therefore, a register need not comprise the type of registers typically associated with microprocessors or with other computer memory systems, although a register may be of the type conventionally associated with microprocessors and other computer memory. However, any circuitry, element, or component capable of representing or reporting at least two states of a mechanically modifiable element is sufficient to define a register.

A variety of mechanically modifiable elements 412 may be associated with RFID tag 402 within the scope of the invention. While the invention has been described with respect to strips 412 which may be torn or may be punched, other types of mechanically modifiable elements may be envisioned as well.

For example, a mechanically modifiable element 412 may comprise multiple layers, such as possibly two layers of material which may be in contact with each other as configured at the factory, and therefore may appear as a single strip or single element. However, it may be the case that by separating two layers of such a strip 412, for example, by peeling apart two layers which are stuck to each other, an electrical contact is broken. In this way the peeling action, by breaking the electrical contact, modifies the mechanical state of the element, and therefore also modifies the electrical state of the element. Therefore the state can be detected and represented in a bit 702 of the register 420 as previously presented above. Moreover, an advantage of the mechanically modifiable element 412, as just described, may be that in addition to separating two layers of the element 412, it may be possible to join the two layers back together again, thus reestablishing the electrical path. As a result it may be possible to toggle a bit from one state to another state, and then back again, repeatedly.

In an alternative embodiment, a strip 412 or other mechanically modifiable element 412 may have a surface coating of a removable material, such as it is sometimes found on lottery tickets and similar items. The user may then mechanically modifying the strip 412 by scratching off the surface material. The strip 412 may be configured so that scratching off the surface material modifies an electrical state of the strip 412, resulting in a detectable change of configuration.

Other mechanically modifiable elements 412 which may be toggled from an on-state to an off-state and back again, repeatedly, may also be envisioned. For example, mechanically modifiable elements 412 may be of a nature such that a small hinged or detachable clip may be placed across them. The clip may serve the purpose of completing an electrical connection or breaking an electrical connection. In this way, again it may be possible that a mechanically modifiable element 412 can be repeatedly modified from a first state to a second state. In conjunction with this, of course, a corresponding bit 702 of register 420 may be set repeatedly from a first state to a second state and back again, as suites the needs of a process, item, or other thing being tracked via RFID tag 402.

The invention has been described with respect to an RFID tag 402 wherein the register 420 or other register elements which tracks the state of the mechanically modifiable elements is construed to be separate from the memory 308 which holds an identification number 318 for the RFID tag. However, in an alternative embodiment, it may be that some or all of the mechanically modifiable elements 412 are employed to modify part or all of the identification number 318 of the RFID tag 402 itself.

The invention has also been described with respect to an RFID tag 402 which has a single register 420 and a single type of mechanically modifiable element 412 which is used to modify the state of bits 702 in the strip state register 420. In an alternative embodiment, RFID tag 402 may have more than one register 420, where each register may serve a different purpose in terms of flagging or identifying or tracking different types of information. Each register 420 may have associated with it its own set of mechanically modifiable elements 412 such as, but not necessarily limited to, the strips 412 already described above.

In an alternative embodiment, more than one type of mechanically modifiable element 412 may be employed. For example, for some applications it may be convenient to have some mechanically modifiable elements 412 which are tearable or rippable, and other mechanically modifiable elements which are punchable. Other additional types of mechanically modifiable elements may be employed as well.

One or more of the mechanically modifiable elements 412, such as one or more tearable strips 412R or punchable strips 412P may be employed to trigger changes to a meaning or condition of other bits 702 in the register 420 which do not correspond strictly to the particular mechanically modifiable element 412 so employed. In alternative embodiments, yet more complex interactions may be envisioned between the logical states which are represented by the alternative mechanical conditions of the mechanically modifiable elements 412. Persons skilled in the relevant arts will recognize that any number of logic circuits, logic gates, or logic elements may be employed to implement a variety of logical outputs, which may result from various combinations of the mechanically modifiable elements 412 and the various mechanical states of the mechanically modifiable elements 412. Moreover, such logic circuits, logic gates, or logic elements may themselves be customizable, that is, field programmable, via RF signals or other means.

Each mechanically modifiable element 412 typically has two states, namely a state where an associated circuit loop 414L is complete and a state where the same circuit path 414S is incomplete. However, consistent with the scope and spirit, it may be possible to employ mechanically modifiable elements which have more than two circuit states, or which even have continuous states associated with them. For example, it may be possible to develop or employ the invention using mechanically modifiable elements 412 which provide analog values of a resistance, a capacitance, an inductance, or a combination of impedances.

The invention has been described above in conjunction with embodiments where the principle data reported by RFID tag 402 may be only the identification of the RFID tag 402 and the status of the mechanically modifiable elements 412. However, it is possible to attach any number of sensors or to associate a variety of sensors with an RFID tag 402. For example, temperature sensors, pressure sensors and other types of sensors have been employed in conjunction with RFID tags 402. Consistent with the scope and spirit of the invention, it may be further possible to attach a variety of sensors to the RFID tag 402, and to program or modify the behavior of those sensors, the data reported via those sensors, or a response to those sensors, by using the mechanically modifiable elements 412 as described above.

The invention has been described above with respect to embodiments where the mechanically modifiable elements 412 may be field-labeled, that is, imprinted by the user with an indicia 1104, 1302 in a variety of ways. In an alternative embodiment, the indicia which may be applied either to the mechanically modifiable elements 412 or to the substrate 302 of RFID tag 402, may be of a type of indicia which can be modified so that the tag may be reused for different purposes over time. For example, a text-receiving surface 1606 of a mechanically modifiable element 412, such as a strip 412, may be such that any text imprinted on the surface may be erasable; or it may be the case that a label 1602 applied to a label-receiving surface 1604 can be removed and a different label 1602 applied at a different time.

In embodiments described above, the user modifies a state of tag 402 by mechanically modifying a mechanically modifiable element 412. In alternative embodiments, RFID tag 402 may have one or more elements which are not themselves mechanically modified, but where a state of the element may be modified through a mechanical action or other action of a user.

For example, in an alternative embodiment of the invention, a strip or strips 412 may have a chemically reactive substance on the surface or embedded within the strip. The application by a user or by an external system of a second chemical to strip or strips 412 may result in a chemical modification of the strip, thereby changing the state of strip 412 and the electrical conductivity of strip 412.

In an alternative embodiment, one or more strips 412 may have a photosensitive material on the surface. By bringing photo emitting elements into proximity with photosensitive strip 412, for example, by bringing a laser light of a specified color within the proximity of the strip, it may be possible to change the state of the strip in a way which can be detected by the electrical-change detecting circuitry within the RFID tag 412.

Persons skilled in the relevant parts will recognize that strips 412 of RFID tag 402 may be configured to be sensitive to other environmental influences which may be mechanically brought into proximity with a strip or strips 412. For example, a strip 412 may be configured to be sensitive to the presence of radioactive materials. Or, for another example, a strip 412 may be configured to be sensitive to the presence of a nearby magnetic field. In either case, a user or a system may bring into proximity with strip 412 a radioactive material or a magnetically active source, thereby changing the state of the strip in a manner which is detectable by circuitry of RFID tag 402.

In an alternative embodiment, RFID tag 402 may be configured so that mechanically modifying a mechanically modifiable element 412 renders RFID tag 402 unresponsive to a query from an RFID reader. In an alternative embodiment, RFID tag may be configured so that mechanically modifying a mechanically modifiable element 412 renders RFID tag 402 responsive to a query from an RFID reader.

11. CONCLUSION

The above examples of a system and method for customizable, mechanically programmable RFID tags are exemplary only. Persons skilled in the relevant arts will recognize that a variety of alternatives may exist in terms of materials, relations of structural and operational elements, and methods of employing or applying the same. Such variations fall within the scope and spirit of the invention which is not limited by the particular examples described above.

While various embodiments of the invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the invention should not be limited by any of the above-described exemplary embodiments, but should be defined only in accordance with the following claims and their equivalents.

What is claimed is:

1. A mechanically modifiable radio frequency identification (RFID) tag, comprising:
   a substrate;
   an integrated circuit (IC) mounted on or within the substrate;
   a register having a plurality of bits;
   a plurality of strips coupled to said substrate and associated with at least one bit of said register, the strip having a surface constructed and arranged to receive a visual or tactile indicia;
   an adhesive coupled with a first side of the strips for attaching one or more of the strips to an item;
   an adhesive substance to hold a second side of the strips against the substrate; and
   wherein a mechanical modification of a strip alters a value of its associated register bit.

2. The RFID tag of claim 1, wherein the strip may be customized via said visual or tactile indicia to indicate a significance of said strip for a custom application of said RFID tag.

3. The RFID tag of claim 1, wherein the strip constructed and arranged to receive a label.

4. The RFID tag of claim 1, wherein the strip is constructed and arranged to receive print.

5. The RFID tag of claim 1, wherein the strip is constructed and arranged to receive a tactile element.

6. The RFID tag of claim 1, wherein the strip is constructed and arranged to receive a user-applied indicia.

7. The RFID tag of claim 1, wherein the strip is a tearable strip constructed and arranged such that severing of the tearable strip alters the value of its respective register bit.

8. The RFID tag of claim 7, wherein:
   the strip is perforated to facilitate tearing; and
   severing along a perforation breaks a conductor of the strip, thereby changing the value of its respective bit.

9. The RFID tag of claim 1, wherein the strip is a punchable strip constructed and arranged such that punching of the strip alters the value of its respective bit.

10. The RFID tag of claim 9, wherein the punching of the punchable strip breaks a conductor of the punchable strip, thereby changing the value of its respective bit.

11. The RFID tag of claim 1, further comprising an adhesive coupled to the substrate of the RFID tag for attaching the tag to an item.

12. The RFID tag of claim 1, further comprising a control element constructed and arranged to change a default value of said bit from a first default value to a second default value different from the first default value.

13. The RFID tag of claim 1 further comprising a strip not associated with a register bit, the status of which is intended to provide only a visual indication of a status of a process.

14. The RFID tag of claim 1 including a plurality of strips associated with respective bits of the register.

15. The RFID tag of claim 1, further comprising:
a piece of protective material removable removably covering the adhesive on the first side of the strips.

16. A mechanically modifiable radio frequency identification (RFID) tag, comprising:
a substrate;
an integrated circuit (IC) mounted on or within the substrate;
a register having a plurality of bits; and
a strip coupled to said substrate and associated with at least one bit of said register, the strip having a surface constructed and arranged to receive a visual or tactile indicia;
wherein a mechanical modification of a strip alters a value of its associated register bit; and
wherein the IC is constructed and arranged to detect at least one of:
a pattern of the bits in the register; and
a time order in which the pattern of bits in the register changes.

17. The RFID tag of claim 16, wherein the tag is constructed and arranged to transmit the bit pattern of the register.

18. The RFID tag of claim 16, wherein the tag is constructed and arranged to transmit the time order in which the pattern of bits in the register changes.

19. The RFID tag of claim 16, wherein the RFID tag is constructed and arranged to transmit an alert signal in response to the detection of a specific pattern or a specific time order.

20. A mechanically modifiable radio frequency identification (RFID) tag, comprising:
a substrate;
an integrated circuit (IC) mounted on or within the substrate;
a register having a plurality of bits; and
a strip coupled to said substrate and associated with at least one bit of said register, the strip having a surface constructed and arranged to receive a visual or tactile indicia;
wherein a mechanical modification of a strip alters a value of its associated register bit; and
a control element constructed and arranged to control the value of a bit of said register regardless of the status of an associated strip.

21. A mechanically modifiable radio frequency identification (RFID) tag, comprising:
a substrate;
an integrated circuit (IC) mounted on or within the substrate;
a plurality of strips coupled to said substrate;
a register having a plurality of bits, each bit being associated with a respective strip, each bit configured to have a default value associated with a mechanically unmodified state of said respective strip; and
a control element;
wherein:
each strip is constructed and arranged so that a mechanical modification thereof alters a value of its respective bit from the default value to a value different from the default value; and
the control element is constructed and arranged to receive a command to perform at least one of:
modifying the default value of the bit to a modified default value which is different from an initial default value; or
decoupling said bit from said respective coupled strip and freezing the value of the bit so that said bit decoupled from said strip does not change value in response to the mechanical alteration of the respective strip formerly coupled with the bit.

22. The RFID tag of claim 21, wherein said control element is constructed and arranged to be programmable via a radio frequency (RF) signal with an address of a bit of the plurality of bits and at least one of the modified default value of said bit or an indication to fix decoupled the bit from said respective strip and to the value of said bit.

23. The RFID tag of claim 21, further comprising a control strip constructed and arranged so that mechanically modifying the control strip triggers the control element to at least one of modify said default value of said bit or decoupled the bit and freeze said value of said bit.

24. The RFID tag of claim 21, wherein a least one strip has a surface constructed and arranged to receive a visual or tactile indicia.

25. The RFID tag of claim 21, wherein said strip comprises at least one of:
a tearable strip, wherein the mechanical modification comprises severing the strip; and
a punchable strip, wherein the mechanical modification comprises punching the strip.

26. The RFID tag of claim 21, wherein:
the strip further comprises a continuous conductor coupled to the respective bit associated with the strip; and
the conductor is breached by at least one of severing the strip or punching the strip.

27. The RFID tag of claim 21, wherein the IC is constructed and arranged to detect at least one of:
a pattern of the bits in the register; and
a time order in which the pattern of bits in the register changes.

28. The RFID tag of claim 27, wherein the tag is constructed and arranged to transmit at least one of:
the bit pattern of the register;
the time order in which the pattern of bits changes;
an alert in response to a specific bit pattern; or
an alert in response to a specific time order in which the pattern of bits changes.

29. The RFID tag of claim 21, further comprising at least one of an adhesive element of the RFID tag and an adhesive element of the strip.

30. A method for monitoring an item or a process using a radio frequency identification (RFID) tag, wherein the RFID tag comprises:
a substrate;
a register have a plurality of bits;
a plurality of strips, each strip being associated with a respective bit, and each strip being suitable to receive a visual or tactile indicia of a purpose of the strip;

an adhesive coupled with a first side of the strips for attaching one or more of the strips to an item;

an adhesive substance to hold a second side of the strips against the substrate;

the RFID tag being constructed and arranged such that a modification of a strip changes a value of the strip's respective register bit;

comprising:

(a) assigning the RFID tag to at least one of the item, the process, an item associated with the process, a person monitoring the process, a monitoring device associated with the process, an assembly line associated with the process, a monitoring station associated with the process, and a conveyance associated with the process;

(b) associating a strip of the plurality of strips with a respective process step or a respective item status;

(c) upon performance of a step of the process or a change of the item status, mechanically modifying the strip associated with that step or status; and (d) reading the RFID tag to determine a bit pattern of the register of the RFID tag.

31. The method of claim 30, further comprising:
configuring the strip of the RFID tag to be automatically modified upon the performance of the step or change of status associated with the strip.

32. The method of claim 30, further comprising at least one of modifying a default value associated with a bit or an ability of a bit to change value in response to a mechanical modification of the strip associated with the bit.

33. The method of claim 32, further comprising:
(i) accepting via a radio frequency (RF) link of the RFID tag an identification of a bit of the plurality of bits;
(ii) accepting via the RF link an indication of whether a default state of the bit is to be changed or whether the value of the bit is to be rendered unchangeable; and
(iii) responsive to the data accepted via steps (i) and (ii), assigning to the identified bit a new default state which is different from the current default state of the identified bit or rendering the value of the identified bit as unchangeable.

34. The method of claim 33, wherein step (iii) further comprises:
(iv) storing in a memory of the RFID tag the identification of the identified bit from step 34(i) and the indication from step 34(ii);
(v) upon detecting a mechanical modification of a control strip of the RFID tag, assigning to the identified bit the new default state or rendering the value of the identified bit as unchangeable.

35. The method of claim 30, further comprising labeling each strip to signify at least one of the process step associated with the strip or the item status associated with the strip.

36. A method for monitoring an item or a process using a radio frequency identification (RFID) tag, wherein the RFID tag comprises:
a register have a plurality of bits;
a plurality of strips, each strip being associated with a respective bit, and each strip being suitable to receive a visual or tactile indicia of a purpose of the strip;
the RFID tag being constructed and arranged such that a modification of a strip changes a value of the strip's respective register bit;

comprising:

(a) assigning the RFID tag to at least one of the item, the process, an item associated with the process, a person monitoring the process, a monitoring device associated with the process, an assembly line associated with the process, a monitoring station associated with the process, and a conveyance associated with the process;

(b) associating a strip of the plurality of strips with a respective process step or a respective item status;

(c) upon performance of a step of the process or a change of the item status, mechanically modifying the strip associated with that step or status;

(d) reading the RFID tag to determine a bit pattern of the register of the RFID tag; and (e) detecting at least one of a particular pattern of bits in the register or a particular order in which the strips are modified.

37. A method for monitoring an item or a process using a radio frequency identification (RFID) tag, wherein the RFID tag comprises:
a substrate;
a register have a plurality of bits;
a plurality of strips, at least one strip being selectively associated with a respective register bit;
an adhesive coupled with a first side of the strips for attaching one or more of the strips to an item;
an adhesive substance to hold a second side of the strips against the substrate;
the RFID tag being constructed and arranged such that a modification of a strip changes a value of its associated register bit;

comprising:

(a) assigning the RFID tag to at least one of the item, the process, an item associated with the process, a person monitoring the process, a monitoring device associated with the process, an assembly line associated with the process, a monitoring station associated with the process, and a conveyance associated with the process;

(b) associating a strip with a respective process step or a respective item status;

(c) modifying at least one of 1) a default value associated with a bit or 2) the association of a bit with a strip thereby controlling the ability of the bit to change value in response to a mechanical modification of a strip associated with the bit;

(d) upon performance of a step of the process or a change of the item status, mechanically modifying the strip associated with that step or status; and (e) reading the RFID tag to determine a bit pattern of the register of the RFID tag.

38. The method of claim 37, further comprising:
configuring the strip of the RFID tag to be automatically modified upon the performance of the step or change of status associated with the strip.

39. The method of claim 37, further comprising labeling each strip to signify at least one of a process step associated with the strip or an item status associated with the strip.

40. The method of claim 37, wherein step (c) further comprises:
(i) accepting via a radio frequency (RF) link of the RFID tag an identification of a bit of the plurality of bits;
(ii) accepting via the RF link an indication of whether a default state of the bit is to be changed or whether the bit is to be associated or disassociated with a strip; and
(iii) responsive to the data accepted via steps (i) and (ii), assigning to the identified bit a new default state which is different from the default state of the identified bit or disassociating the bit with a strip.

41. The method of claim 40, wherein step (iii) further comprises:
(iv) storing in a memory of the RFID tag the identification of the identified bit from step 41(i) and the indication from step 41(ii);

(v) upon detecting a mechanical modification of a control strip of the RFID tag, assigning to the identified bit the new default state or decoupling the bit.

42. A method for monitoring an item or a process using a radio frequency identification (RFID) tag, wherein the RFID tag comprises:

a register have a plurality of bits;

a plurality of strips, at least one strip being selectively associated with a respective register bit;

the RFID tag being constructed and arranged such that a modification of a strip changes a value of its associated register bit;

comprising:

(a) assigning the RFID tag to at least one of the item, the process, an item associated with the process, a person monitoring the process, a monitoring device associated with the process, an assembly line associated with the process, a monitoring station associated with the process, and a conveyance associated with the process;

(b) associating a strip with a respective process step or a respective item status;

(c) modifying at least one of 1) a default value associated with a bit or 2) the association of a bit with a strip thereby controlling the ability of the bit to change value in response to a mechanical modification of a strip associated with the bit;

(d) upon performance of a step of the process or a change of the item status, mechanically modifying the strip associated with that step or status;

(e) reading the RFID tag to determine a bit pattern of the register of the RFID tag; and (f) detecting at least one of a particular pattern of bits in the register or a particular order in which the strips are modified.

* * * * *

UNITED STATES PATENT AND TRADEMARK OFFICE
CERTIFICATE OF CORRECTION

| | | |
|---|---|---|
| PATENT NO. | : 7,876,222 B2 | Page 1 of 1 |
| APPLICATION NO. | : 11/847974 | |
| DATED | : January 25, 2011 | |
| INVENTOR(S) | : Calvarese | |

It is certified that error appears in the above-identified patent and that said Letters Patent is hereby corrected as shown below:

On the Face Page, in Field (57), under "ABSTRACT", in Column 2, Line 9, delete "or the process." and insert -- of the process. --, therefor.

In Column 1, Line 31, delete "tags" and insert -- tags. --, therefor.

In Column 11, Line 67, delete "tearing." and insert -- tearing, --, therefor.

In Column 15, Line 10, delete "to the," and insert -- to the --, therefor.

In Column 19, Line 52, delete "tom," and insert -- torn, --, therefor.

In Column 21, Line 2, delete "spirit of the." and insert -- spirit of the invention. --, therefor.

In Column 26, Line 30, in Claim 24, delete "a" and insert -- at --, therefor.

Signed and Sealed this
First Day of January, 2013

David J. Kappos
*Director of the United States Patent and Trademark Office*